US006584284B1

(12) United States Patent
Odaka

(10) Patent No.: US 6,584,284 B1
(45) Date of Patent: Jun. 24, 2003

(54) CAMERA PROVIDED WITH FOCUS ADJUSTING APPARATUS

(75) Inventor: Yukio Odaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,236

(22) Filed: Nov. 16, 2000

(30) Foreign Application Priority Data

Nov. 18, 1999 (JP) .......................................... 11-327603

(51) Int. Cl.[7] .................................................. G03B 17/18
(52) U.S. Cl. ......................... 396/121; 396/147; 396/296
(58) Field of Search ................................ 396/121, 147, 396/296, 297, 299; 348/345, 346

(56) References Cited

U.S. PATENT DOCUMENTS

| | | | |
|---|---|---|---|
| 5,194,888 A | 3/1993 | Akashi et al. | 354/402 |
| 5,367,153 A | 11/1994 | Suda et al. | 250/201.8 |
| 5,497,210 A | 3/1996 | Odaka | 354/402 |
| 5,659,814 A | * 8/1997 | Matsukawa | 396/121 |
| 6,085,042 A | * 7/2000 | Yamamoto | 396/121 |

* cited by examiner

*Primary Examiner*—Russell Adams
*Assistant Examiner*—Arthur A. Smith
(74) *Attorney, Agent, or Firm*—Fitzpatrick, Cella, Harper & Scinto

(57) ABSTRACT

This invention relates to a camera provided with a focus adjusting apparatus having an automatic mode for automatically selecting a focus detection area and an arbitrary mode for manually selecting the focus detection area. This invention provides a camera designed such that even in the case of the automatic mode in the camera, when an in-focus state is attained, the selection of the focus detection area can be effected in that state by a manual operation.

5 Claims, 20 Drawing Sheets

| FIG. 5A | FIG. 5B |

FIG. 7

| SWMODE 4 | SWMODE 3 | SWMODE 2 | SWMODE 1 | PHOTOGRAPHING MODE |
|---|---|---|---|---|
| ON | ON | ON | ON | MANUAL EXPOSURE |
| ON | ON | ON | OFF | AV PRIORITY |
| ON | ON | OFF | ON | TV PRIORITY |
| ON | ON | OFF | OFF | PROGRAM AE |
| ON | OFF | ON | ON | LOCK |
| OFF | ON | ON | ON | FULL AUTO |
| OFF | ON | ON | OFF | PORTRAIT |
| OFF | ON | OFF | ON | LANDSCAPE |
| OFF | ON | OFF | OFF | CLOSE-UP |
| OFF | OFF | ON | ON | SPORT |

FIG. 17A

| CURRENT AF POINT, VARIABLE F_POINT INDICATED IN PARENTHESES |
|---|
| LEFT OUTSIDE POINT (1) |
| LEFT INSIDE POINT (2) |
| CENTER POINT (3) |
| RIGHT INSIDE POINT (4) |
| RIGHT OUTSIDE POINT (5) |
| UPPER SIDE POINT (6) |
| LOWER SIDE POINT (7) |

| AF POINT AFTER CHANGE, VARIABLE F_POINT INDICATED IN PARENTHESES |
|---|
| LOWER SIDE POINT (7) |
| LOWER SIDE POINT (7) |
| LOWER SIDE POINT (7) |
| LOWER SIDE POINT (7) |
| LOWER SIDE POINT (7) |
| CENTER POINT (3) |
| LOWER SIDE POINT (7) |

FIG. 17B

| CURRENT AF POINT, VARIABLE F_POINT INDICATED IN PARENTHESES |
|---|
| LEFT OUTSIDE POINT (1) |
| LEFT INSIDE POINT (2) |
| CENTER POINT (3) |
| RIGHT INSIDE POINT (4) |
| RIGHT OUTSIDE POINT (5) |
| UPPER SIDE POINT (6) |
| LOWER SIDE POINT (7) |

| AF POINT AFTER CHANGE, VARIABLE F_POINT INDICATED IN PARENTHESES |
|---|
| UPPER SIDE POINT (6) |
| UPPER SIDE POINT (6) |
| UPPER SIDE POINT (6) |
| UPPER SIDE POINT (6) |
| UPPER SIDE POINT (6) |
| CENTER POINT (3) |

FIG. 17C

| CURRENT AF POINT, VARIABLE F_POINT INDICATED IN PARENTHESES |
|---|
| LEFT OUTSIDE POINT (1) |
| LEFT INSIDE POINT (2) |
| CENTER POINT (3) |
| RIGHT INSIDE POINT (4) |
| RIGHT OUTSIDE POINT (5) |
| UPPER SIDE POINT (6) |
| LOWER SIDE POINT (7) |

↓ ↓ ↓ ↓ ↓ ↓

| AF POINT AFTER CHANGE, VARIABLE F_POINT INDICATED IN PARENTHESES |
|---|
| LEFT INSIDE POINT (2) |
| CENTER POINT (3) |
| RIGHT INSIDE POINT (4) |
| RIGHT OUTSIDE POINT (5) |
| RIGHT OUTSIDE POINT (5) |
| RIGHT OUTSIDE POINT (5) |

FIG. 17D

| CURRENT AF POINT, VARIABLE F_POINT INDICATED IN PARENTHESES |
|---|
| LEFT OUTSIDE POINT (1) |
| LEFT INSIDE POINT (2) |
| CENTER POINT (3) |
| RIGHT INSIDE POINT (4) |
| RIGHT OUTSIDE POINT (5) |
| UPPER SIDE POINT (6) |
| LOWER SIDE POINT (7) |

↓ ↓ ↓ ↓ ↓ ↓

| AF POINT AFTER CHANGE, VARIABLE F_POINT INDICATED IN PARENTHESES |
|---|
| LEFT OUTSIDE POINT (1) |
| LEFT OUTSIDE POINT (1) |
| LEFT INSIDE POINT (2) |
| CENTER POINT (3) |
| RIGHT INSIDE POINT (4) |
| LEFT OUTSIDE POINT (1) |
| LEFT OUTSIDE POINT (1) |

CAMERA PROVIDED WITH FOCUS ADJUSTING APPARATUS

BACKGROUND OF THE INVENTION

1. Field of the Invention

This invention relates to improvements in an automatic focus camera such as a photographic camera or a video camera.

2. Related Background Art

There has heretofore been proposed an automatic focus adjusting apparatus of the plural focal points detection type having in a photo-taking image field a plurality of areas which are the objects of focus adjustment (hereinafter referred to as the AF points) and designed to select any AF point therefrom and effect focus detection. For example, in a camera using an automatic focus adjusting apparatus of the passive type utilizing the natural light of an object, focus detection is effected at a plurality of AF points, and from the result of the focus detection at respective ones of these points, an AF point intended by a photographer is presumed and selected. The focus state of a photo-taking lens is controlled on the basis of the focus detection information.

According to a function of this kind, wherever in the photo-taking image field the position of an object may be, automatic focus adjustment is effected, an this leads to the advantage that the photographer can devote his efforts entirely to picturing and composition. In a single-lens reflex camera or the like, however, the photographer often uses the camera to pursue picturing as he wishes by a more unique photographing technique. In such a case, it is more preferable for the photographer himself to directly control the camera through some manual inputting means than to automatically effect the selection of the AF points by the camera. For example, when the camera is fixed to a tripod and operated, the technique of AF lock cannot be used and therefore, the AF point control by the photographer's will is very effective. Also in such a composition in which an obstacle is present nearer than a main object, it is difficult to automatically discriminate between the two and therefore, the selection by the manual inputting of the photographer is preferable.

As described above, there are two methods of selecting one (or a few) AF point to be actually used in the control of the photo-taking lens from the result of focus detection at respective ones of a plurality of AF points. One is an automatic selecting method, and the other is an arbitrary selecting method based on the manual inputting of the photographer. There has already been proposed a camera designed such that two selecting means based on the above-described two selecting methods are provided together in a camera so that the photographer can arbitrarily change them. The construction in this case is, for example, as follows.

When a button provided in the camera for setting the automatic selecting method and the arbitrary selecting method is depressed when the camera is left as it is (an example of the indicated state of the outside indication at this time is shown in FIG. 18 of the accompanying drawings), the camera enters an AF point setting mode. FIG. 19 of the accompanying drawings shows an example of the indicated state of the outside indication at this time. This indicated state shown in FIG. 19 represents an automatically selected state, and shows that the camera is now in the automatically selected state.

When in the state of FIG. 19, the dial of the camera is rotated by 1 click to the right side, the camera comes to select the left outside AF point by the manual selecting method. FIG. 20 of the accompanying the outside indicated state at this time. As the dial is continuously rotated by 1 click each to the right side, the camera is changed over in such a manner as the left inside AF point→the upper side AF point→the central AF point→→the lower side AF point→the right inside AF point→the right outside AF point→automatic selection. Also, as the dial is rotated by 1 click each to the left side, the camera is changed over in such a manner as automatic selection→the right outside AF point→the right inside AF point→the lower side AF point→the central AF point→the upper side AF point→the left inside AF point→the left outside AF point→automatic selection.

When the AF points are selected in the manner described above and the other operating button is depressed, the AF point at this time is set. In such a case, the greater the number of the AF points becomes, the more operations become necessary to select the AF point. Still more operations will become necessary if the number of the AF points becomes greater in two-dimensional directions.

In the camera wherein the AF points are thus two-dimensionally disposed, there have also been proposed a camera using a track ball as an operating member for selecting the AF point, and a camera using an operating member capable of indicating two-dimensional directions. When these operating members are used, the AF point can be simply changed to a vertical direction or a horizontal direction and therefore, operability is markedly improved. These operating members are often disposed at a location easy for the photographer to operate while holding the camera, for example, on the back of the camera, in order to make the operability better.

SUMMARY OF THE INVENTION

One aspect of the application is to provide an automatic focus camera which can prevent the malfunctioning of inadvertently changing an area for detecting the focus state and moreover can improve the operability of changing the area.

One aspect of the application is to provide an automatic focus camera which can prevent the malfunctioning of inadvertently changing an area for detecting the focus state.

One aspect of the application is to provide a camera provided with a focus detecting circuit for effecting focus detection in a plurality of different areas in an image field, and a focus adjusting apparatus having an automatic mode for automatically selecting predetermined one of the results of focus detection in the plurality of areas and effecting focus adjustment, and an arbitrary mode for selecting any one of the plurality of areas and effecting focus adjustment, the camera being provided with:

a change operating member for changing the area in the arbitrary mode;

a changing circuit for changing and setting the selected area by the operation of the change operating member; and a control circuit for effecting the changing and setting of the area in the changing circuit by the operation of the change operating member in an in-focus state when the mode is the automatic mode.

One aspect of the application is to provide a camera provided with a focus adjusting apparatus having a focus detecting circuit for effecting focus detection in a plurality of different areas in an image field, a mode setting member for selecting an automatic mode for automatically selecting predetermined one of the results of focus detection in the plurality of areas, and an arbitrary mode for selecting any one of the plurality of areas, and a driving circuit for driving an imaging lens in conformity with the result selected during the automatic mode, and driving the imaging lens in conformity with the result of detection detected by the focus detecting circuit in the area selected during the arbitrary mode, the camera being provided with:

a change operating member for changing the area in the arbitrary mode;

a changing circuit for changing and setting the selected area by the operation of the change operating member;

a judging circuit for judging whether the result of the detection by the focus detecting circuit after the lens driving by the lens driving circuit when the mode is the automatic mode is an in-focus state; and a control circuit for effecting the changing and setting of the area in the changing circuit by the operation of the change operating member when it is judged by the judging circuit that the result of the detection is the in-focus state.

One aspect of the application is to provide a camera provided with a focus detecting circuit for effecting focus detection in a plurality of different areas in an image field, and a focus adjusting apparatus having an automatic mode for automatically selecting predetermined one of the results of focus detection in the plurality of areas and effecting focus adjustment, and an arbitrary mode for selecting any one of the plurality of areas and effecting focus adjustment, the camera having:

a change operating member for changing the area in the arbitrary mode;

a changing circuit for changing and setting the selected area by the operation of the change operating member; and a condition circuit for making the conditions under which the functions of the changing circuit when the mode is the arbitrary mode and when the mode is the automatic mode are effective different from each other.

One aspect of the application is to provide a camera provided with a focus detecting circuit for effecting focus detection in a plurality of different areas in an image field, and a focus adjusting apparatus having an automatic mode for automatically selecting predetermined one of the results of focus detection in the plurality of areas and effecting focus adjustment, and an arbitrary mode for selecting any one of the plurality of areas and effecting focus adjustment, the camera having:

a change operating member for changing the area in the arbitrary mode;

a changing circuit for changing and setting the selected area by the operation of the change operating member; and a control circuit for effecting the response of the changing circuit to the operation of the change operating member when the change operating member is operated a plurality of times.

One aspect of the application is to provide a camera provided with a focus detecting circuit for effecting focus detection in a plurality of different areas in an image field, and a focus adjusting apparatus having an automatic mode for automatically selecting predetermined one of the results of focus detection in the plurality of areas and effecting focus adjustment, and an arbitrary mode for selecting any one of the plurality of areas and effecting focus adjustment, the camera having:

a change operating member for changing the area in the arbitrary mode;

a changing circuit for changing and setting the selected area by the operation of the change operating member; and a control circuit for effecting the response of the changing circuit to the operation of the change operating member when the change operating member is operated for a predetermined time or longer.

BRIEF DESCRIPTION OF THE DRAWINGS

FIG. 7 shows the corresponding relations between the states of switches SWMODE1 to SWMODE4 provided in the camera of FIG. 1 and photographing modes.

FIGS. 17A, 17B, 17C and 17D show "AF point changing tables" when the lower button, the upper button, the right button or the left button of an AF point select key provided in the camera according to an embodiment of the present invention.

DESCRIPTION OF THE PREFERRED EMBODIMENT

Figure 1:
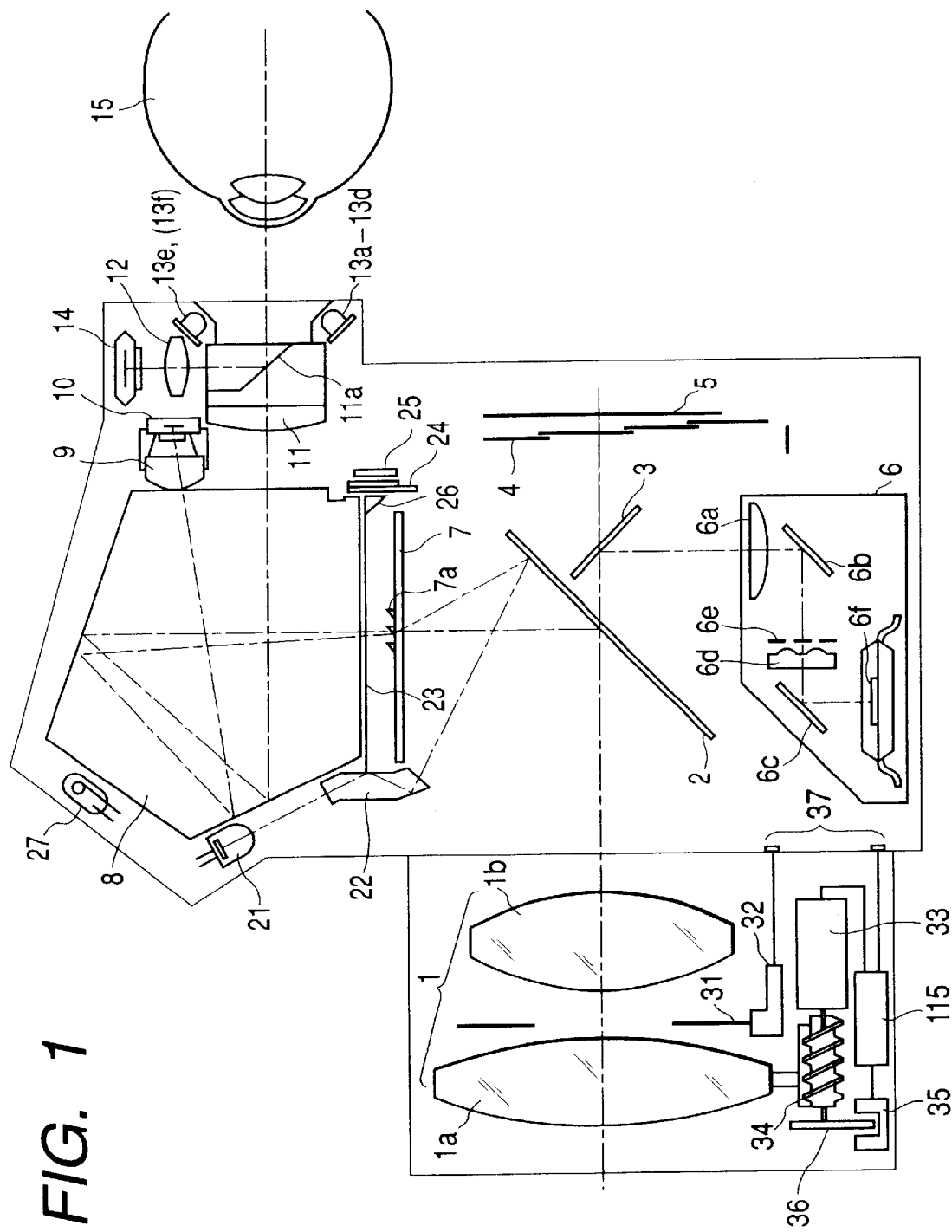
FIG. 1 is a schematic view showing the essential portions of a single-lens reflex camera according to an embodiment of the present invention.

The present invention will hereinafter be described in detail with respect to an embodiment thereof shown in the drawings.

Figure 2A:
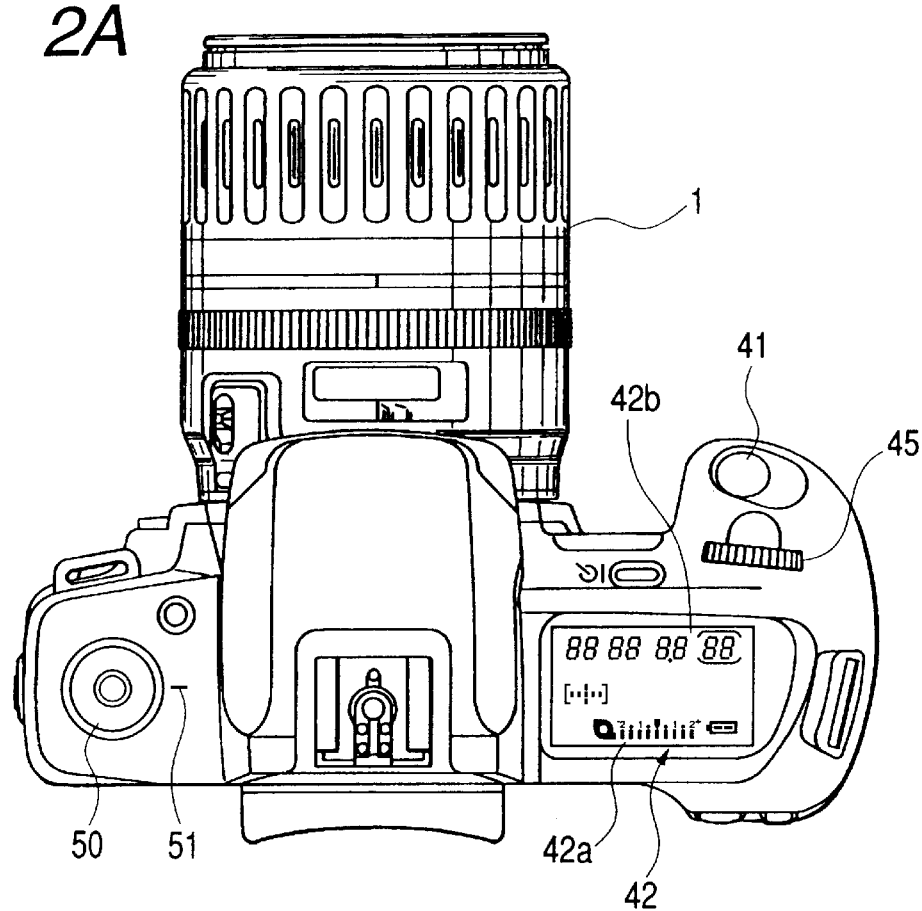
FIGS. 2A and 2B show the upper surface and back, respectively, of the camera of FIG. 1.
Figure 2B:
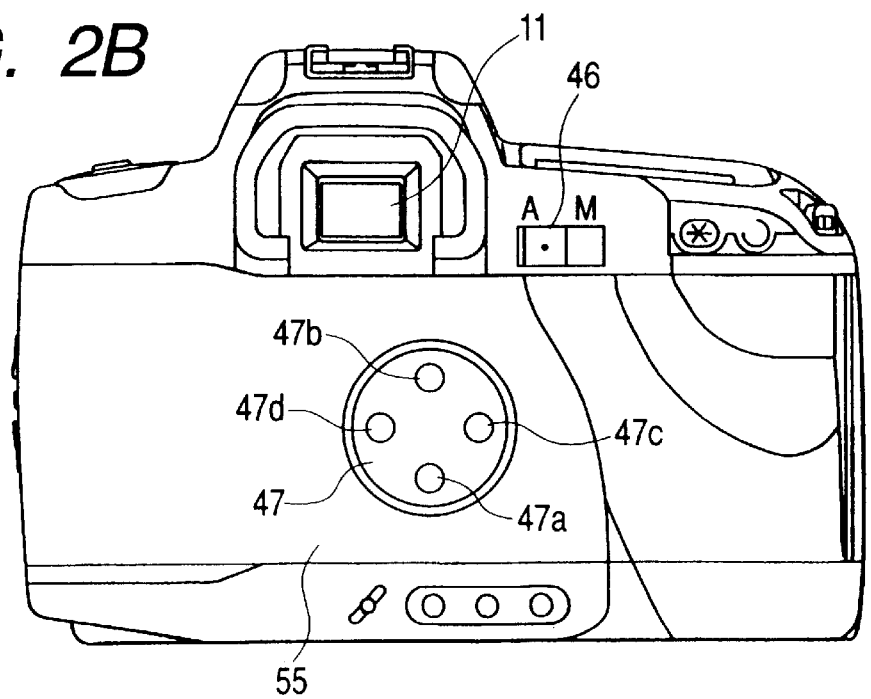
Figure 3:
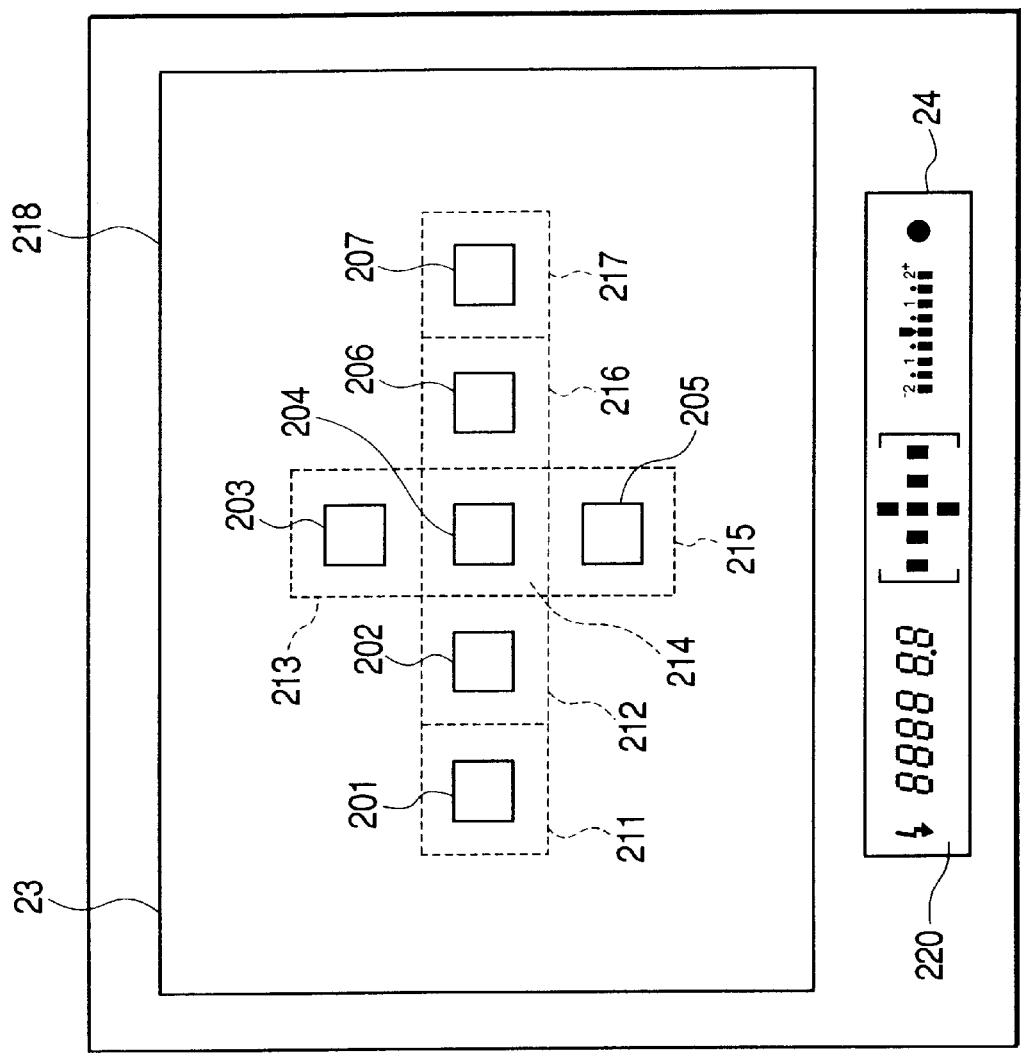
FIG. 3 is a view for illustrating the interior of the finder field of view of the camera of FIG. 1.

FIGS. 1 to 3 show an embodiment of the present invention, and more particularly, FIG. 1 is a schematic view of the essential portions of a single-lens reflex camera, FIGS. 2A and 2B show the upper surface and back, respectively, of the single-lens reflex camera of FIG. 1, and FIG. 3 is an illustration of the interior of the finder field of view shown in FIG. 1.

In these figures, the reference numeral 1 designates a photo-taking lens, which for the sake of convenience, is shown as two lenses, but actually is comprised of more lenses. The reference numeral 2 denotes a main mirror which is obliquely disposed or retracted to a photographing optical path in conformity with the observed state of an object by a finder system and the photographed state of an object image. The reference numeral 3 designates a sub-mirror which reflects a beam transmitted through the main mirror 2 toward a focus detecting apparatus 6 in the lower portion of a camera body which will be described later. The reference numeral 4 denotes a shutter, and the reference numeral 5 designates film. The reference numeral 6 denotes a focus detecting apparatus comprised of a field lens 6a disposed near an imaging plane, reflecting mirrors 6b and 6c, a secondary imaging lens 6d, an aperture step 6e, a sensor 6f, etc. The focus detecting apparatus 6 in the present embodiment uses the well-known phase difference method, and as shown in FIG. 3, is designed such that a plurality of areas (seven areas) in the observation image field (in the finder field of view) are AF points and these AF points are capable of detecting the focal point.

The reference numeral 7 designates a focusing plate disposed on the predetermined imaging plane of the photo-taking lens 1, the reference numeral 8 denotes a pentaprism for changing the finder optical path, and the reference numerals 9 and 10 designates an imaging lens and a photometry sensor, respectively, for measuring the luminance of the object in the observation image field. The imaging lens 9 is related conjugately with the focusing plate 7 and the photometry sensor 10 through a reflecting optical path in the pentaprism 8. The reference numeral 11 denotes an eyepiece disposed rearwardly of the emergence surface of the pentaprism 8, and the eyepiece 11 is used for the observation of the focusing plate 7 by a photographer's eye 15.

AF point marks 201, 202, 203, 204, 205, 206 and 207 shown in FIG. 3 are carved in the focusing plate 7, and are designed such that the photographer can grasp the positions of focus detection areas (AF points) in the photo-taking image field.

The reference numeral 23 designates a field mask forming a finder field area, and the reference numeral 24 denotes an in-finder LCD for displaying photographing information outside the finder field of view, and it is illuminated by an illuminating LED (F-LED) 25. The light transmitted through the LCD 24 is directed into the finder field of view by a triangular prism 26, and is displayed outside the finder field of view as indicated at 220 in FIG. 3, and the photographer can know the photographing information.

The reference numeral 31 designates an aperture stop provided in the photo-taking lens 1, the reference numeral 32 denotes an aperture stop driving device including an aperture stop drive circuit 111 which will be described later, the reference numeral 33 denotes a lens driving motor, and the reference numeral 34 designates a lens driving member comprising a driving gear or the like. The reference numeral 35 denotes a photocoupler which detects the rotation of a pulse plate 36 operatively associated with the lens driving member 34 and transmits it to a lens focus adjust circuit 115. The focus adjust circuit 115 is adapted to drive a lens driving motor by a predetermined amount on the basis of this information and the information of a lens driving amount from the camera side, and move the photo-taking lens 1 to an in-focus position. The reference numeral 37 designates a mount contact which provides the interface between a conventional camera and lens.

In FIGS. 2A and 2B, the reference numeral 41 denotes a release button, and the reference numeral 42 designates a monitor LCD as an outside monitor display device, and it comprises a fixed segment display portion 42a for displaying a predetermined pattern, and a 7-segment display portion 42b for displaying a variable numerical value. The reference numeral 50 denotes a mode dial for effecting the setting of photographing modes, etc. The reference numeral 55 designates a back lid. The reference numeral 46 denotes an AF point selecting mode lever designed to be capable of changing over the automatic selecting mode and the arbitrary selecting mode. The reference numeral 47 designates an AF point select key which is a member for performing the AF point changing operation. This AF point select key 47 is an operating member capable of indicating two-dimensional directions, and is comprised of four push buttons, i.e., a lower button 47a for downwardly changing the AF point, an upper button 47b for upwardly changing the AF point, a right button 47c for rightwardly changing the AF point, and a left button 47d for leftwardly changing the AF point so as to be capable of effecting direction indication in a vertical direction and a horizontal direction.

The other operating members are not particularly necessary for the understanding of the present invention and therefore need not be described.

Figure 4:
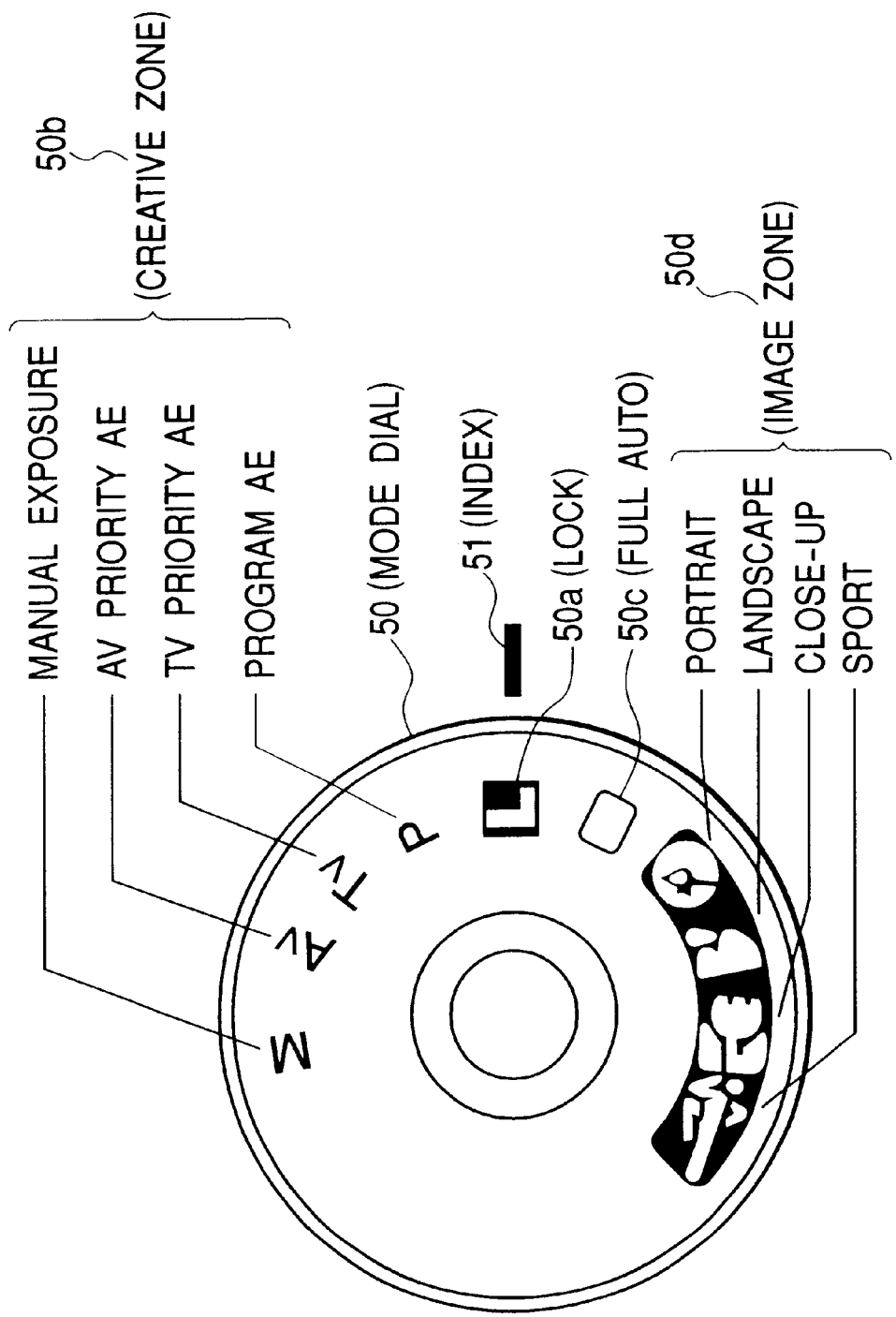
FIG. 4 shows the details of a mode dial 50 provided on the camera of FIG. 1.

FIG. 4 shows the details of the mode dial 50 shown in FIG. 2A, and by adjusting the indication to an index 51 printed on the camera, the photographing mode can be set on that indicated content.

In FIG. 4, the reference character 50a designates a lock position for rendering the camera inoperative, and the reference character 50b denotes a creative zone in which the photographer can set a photographing content, and it has program AE, TV priority AE, AV priority AE, and each photographing mode for manual exposure. The reference character 50c designates a full auto mode position in which full auto photographing entrusted to the camera is possible. The reference character 50d denotes an image zone in which full auto photographing by situation entrusted to the camera is possible, and it has various photographing modes such as a portrait mode suitable for portrait photographing, a landscape mode suitable for landscape photographing, a close-up mode suitable for close-up photographing, and a sport mode suitable for the photographing of a moving object such as a sports meeting.

Figures 5, 5A:
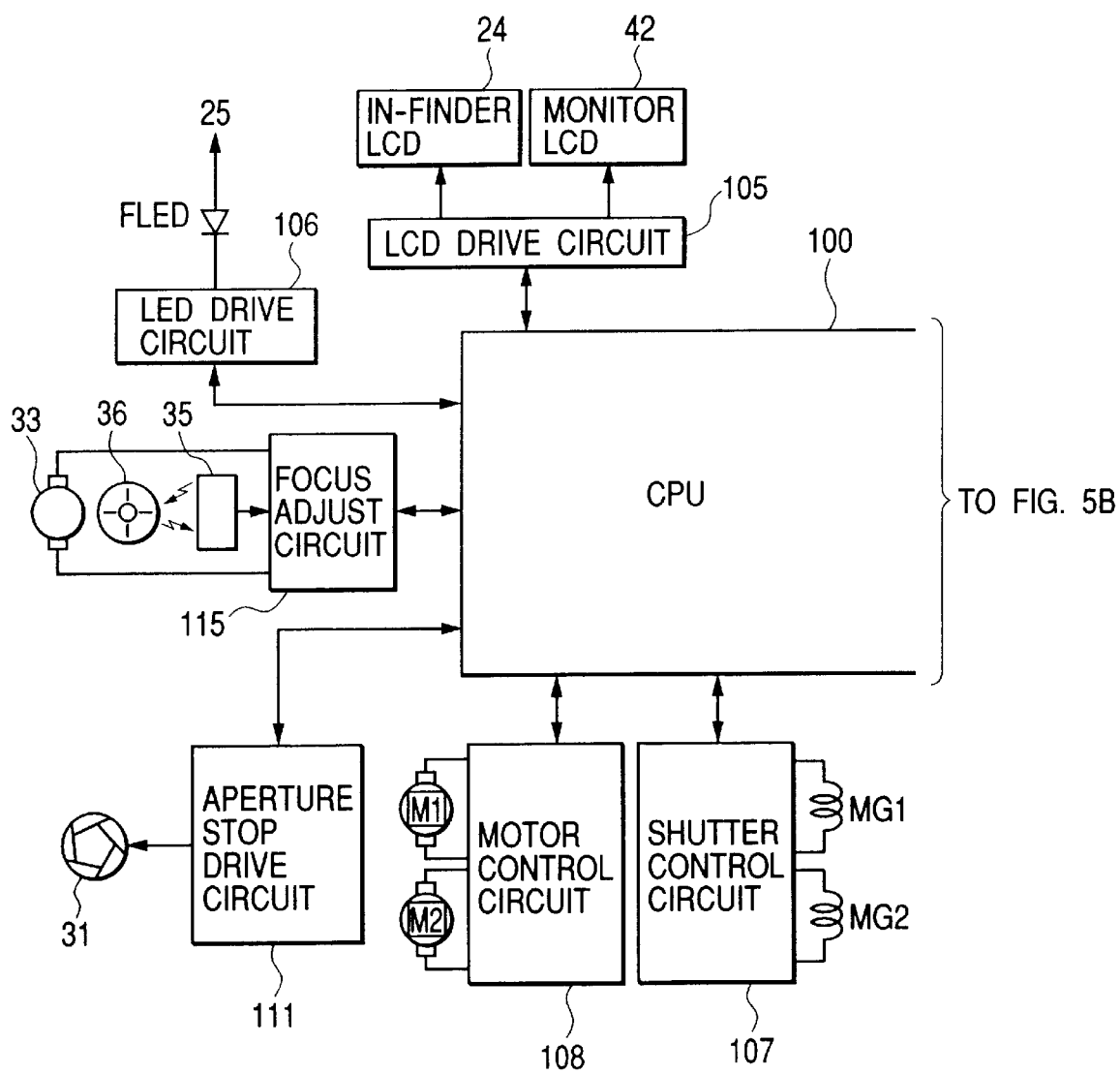
FIG. 5 composed of FIGS. 5A and 5B, is a block diagram showing the electrical construction of the camera of FIG. 1.
Figure 5B:
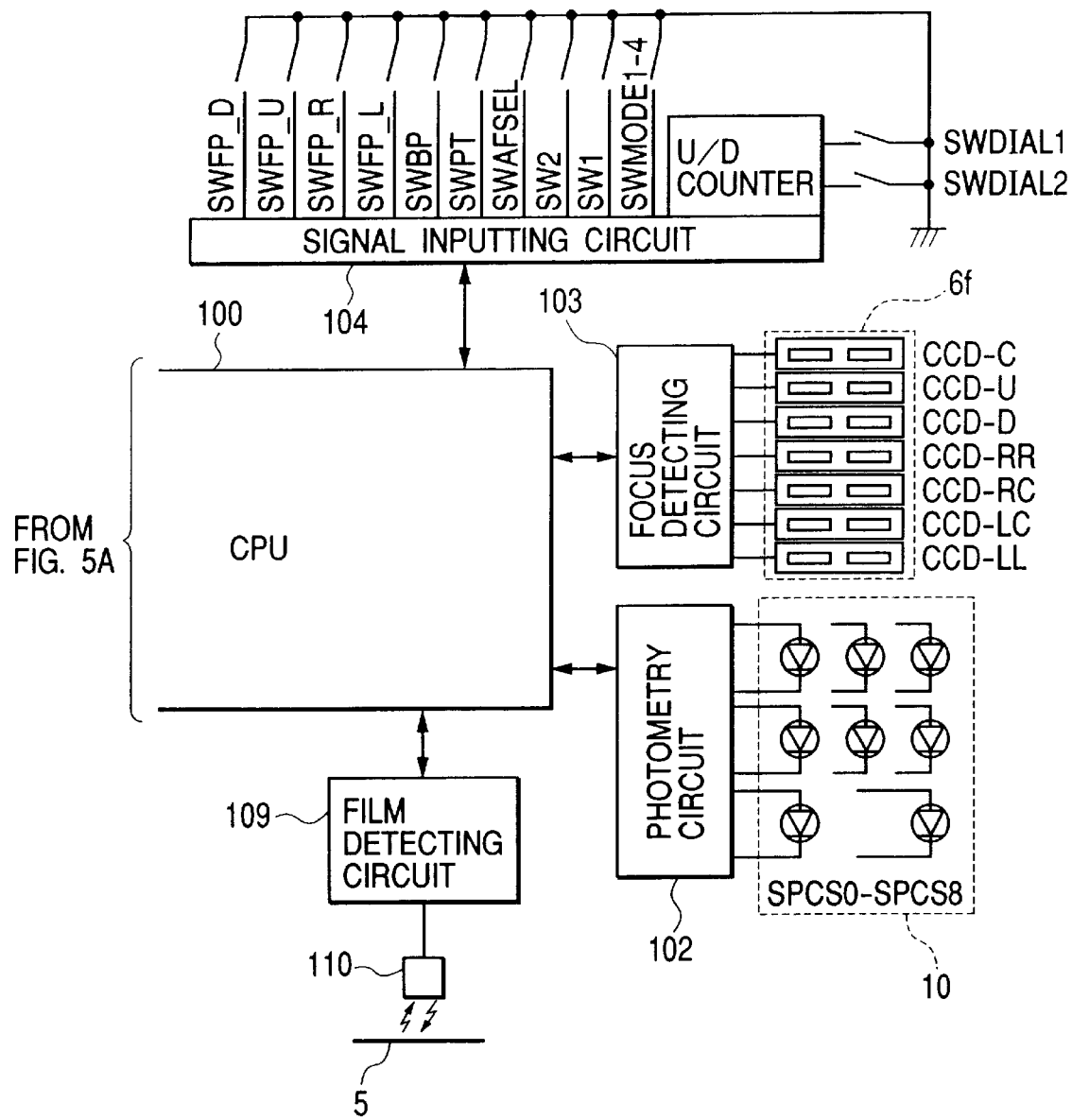

FIGS. 5A and 5B are block diagrams showing an electrical construction contained in the single-lens reflex camera of the above-described construction, and in FIGS. 5A and 5B, the same members as those in FIG. 1, etc. are given the same reference numerals.

A central processing unit (hereinafter referred to as CPU) 100 in a microcomputer contained in the main body of the camera has connected thereto a photometry circuit 102, an automatic focus detecting circuit 103, a signal inputting circuit 104, an LCD drive circuit 105, a LED drive circuit 106, a shutter control circuit 107, a motor control circuit 108 and a film detecting circuit 109. Also, the transmission of a signal to the focus adjust circuit 115 and the aperture stop drive circuit 111 disposed in the photo-taking lens 1 is effected through the mount contact 37 shown in FIG. 1.

The photometry circuit 102 amplifies the output from the photometry sensor 10, and thereafter logarithmically compresses and A/D-converts it, and transmits it as the luminance information of each sensor to the CPU 100. The photometry sensor 10 is comprised of eight photodiodes, i.e., SPC-S1 for photometering an area S1 including a left outside AF point 201 in the finder field of view, SPC-S2 for photometering an area S2 including a left inside AF point 202 in the finder field of view, SPC-S3 for photometering an area S3 including an upper side AF point 203 in the finder field of view, SPC-S4 for photometering an area S4 including a central side AF point 204 in the finder field of view, SPC-S5 for photometering an area S5 including a lower side AF point 205 in the finder field of view, SPC-S6 for photometering an area S6 including a right inside AF point 206 in the finder field of view, SPC-S7 for photometering an area S7 including a right outside AF point 207 in the finder field of view, and SPC-S8 for photometering a peripheral area S8.

The line sensor 6f of FIG. 5B is a conventional CCD line sensor comprised of seven sets of line sensors CCD-LL, CCD-LC, CCD-C, CCD-RC, CCD-RR, CCD-U and CCD-D corresponding to the sensor AF points 201 to 207 in the image field, as shown in FIG. 3. The automatic focus detecting circuit 103 A/D-converts a voltage obtained from the line sensor 6f, and sends it to the CPU 100.

The signal inputting circuit 104 is a circuit for inputting the states of the operating members, etc. of the camera, and switches connected thereto will now be described.

SW1 is a switch adapted to be closed by a first stroke of the release button 41 to thereby start photographing preparatory operations such as photometry and focus detection, and SW2 is a release switch adapted to be closed by a second stroke of the release button 41 to thereby start the photographing operation. Switches SWDIAL1 and SWDIAL2 are dial switches provided in an electronic dial 45, and the state signal thereof is inputted to the up down counter of the signal inputting circuit 104 and is counted as the rotational click amount of the electronic dial 45. Specifically, when the electronic dial 45 is rightwardly rotated, the up down counter up-counts, and when the electronic dial 45 is leftwardly rotated, the up down counter down-counts. These switches SWDIAL1 and SWDIAL2 are used for the setting or the like of shutter time.

SWMODE1 to SWMODE4 are switches operatively associated with the mode dial 50, and are constructed such that depending on the position adjusted to the index 51, the ON/OFF states of the switches SWMODE1 to SWMODE4 differ from one another. FIG. 7 shows the correspondence table of the states of these switches SWMODE1 to SWMODE4 and the photographing modes.

SWBP is a switch adapted to be closed and opened in operative association with the opening and closing operations of the back lid 55, and is closed when the back lid 55 is opened, and is opened when the back lid 55 is closed. SWPT is a switch for detecting whether the film is present in a film containing chamber, and is adapted to be opened when the film is present, and to be closed when the film is absent. SWAFSEL is a switch adapted to be closed and opened in operative association with the sliding operation of the AF point selecting mode lever 46, and the switch SWAFSEL is closed when this AF point selecting mode lever 46 is slid to M side, i.e., the arbitrary selecting mode side, and the switch SWAFSEL is opened when the AF point selecting mode lever 46 is slid to A side, i.e., the automatic selecting mode side.

SWFP_D is a switch adapted to be closed and opened in operative association with the operation of the lower button 47a of the AF point select key 47, and the switch SWFP_D is closed when the lower button 47a of the AF point select key 47 is depressed, and the switch SWFP_D is opened when the lower button 47a is not depressed. Also SWFP_U is a switch adapted to be closed and opened in operative association with the operation of the upper button 47b of the AF point select key 47, and the switch SWFP_U is closed when the upper button 47b of the AF point select key 47 is depressed, and the switch SWFP_U is opened when the upper button 47b is not depressed. Also, SWFP_R is a switch adapted to be closed and opened in operative association with the operation of the right button 47c of the AF point select key 47, and the switch SWFP_R is closed when the right button 47c of the AF point select key 47 is depressed, and the switch SWFP_R is opened when the right button 47c is not depressed. Also, SWFP_L is a switch adapted to be closed and opened in operative association with the operation of the left button 47d of the AF point select key 47, and the switch SWFP_L is closed when the left button 47d of the AF point select key 47 is depressed, and the switch SWFP_L is opened when the left key 47d is not depressed.

The signals of these switches are inputted to the signal inputting circuit 104, and are transmitted to the CPU 100 by a data bus.

The LCD drive circuit 105 is a conventional circuit for display-driving a liquid crystal display element LCD, and enables an aperture value, a shutter time and various set states to be displayed at a time on both of the monitor LCD 42 and the in-finder LCD 24 in accordance with the signal from the CPU 100. Also, the LCD drive circuit 105 includes a circuit for driving a sound producing body, not shown, and can make in-focus sound during the in-focus time in accordance with the signal from the CPU 100.

The LED drive circuit 106 controls to turn on and turn off the illuminating LED (F-LED) 25. The shutter control circuit 107 controls a magnet MG1 for moving a forward curtain when electrically energized, and a magnet MG2 for moving a rearward curtain when electrically energized, and exposes the film 5 to a predetermined quantity of light. The motor control circuit 108 is for controlling a motor MI for effecting the winding-up and rewinding of the film 5, and a motor M2 for effecting the charging of the main mirror 2 and the shutter 4. The film detecting circuit 109 is for detecting the feeding speed of the film 5 and the position of the film during the feeding of the film by the signal from the photosensor 110. Design is made such that when a predetermined signal is outputted from the photosensor 110 during the feeding of the film, it can be detected that the feeding of one frame has been completed.

A series of release sequence are operated by the shutter control circuit 107, the motor control circuit 108 and the film control circuit 109.

Figure 6A:
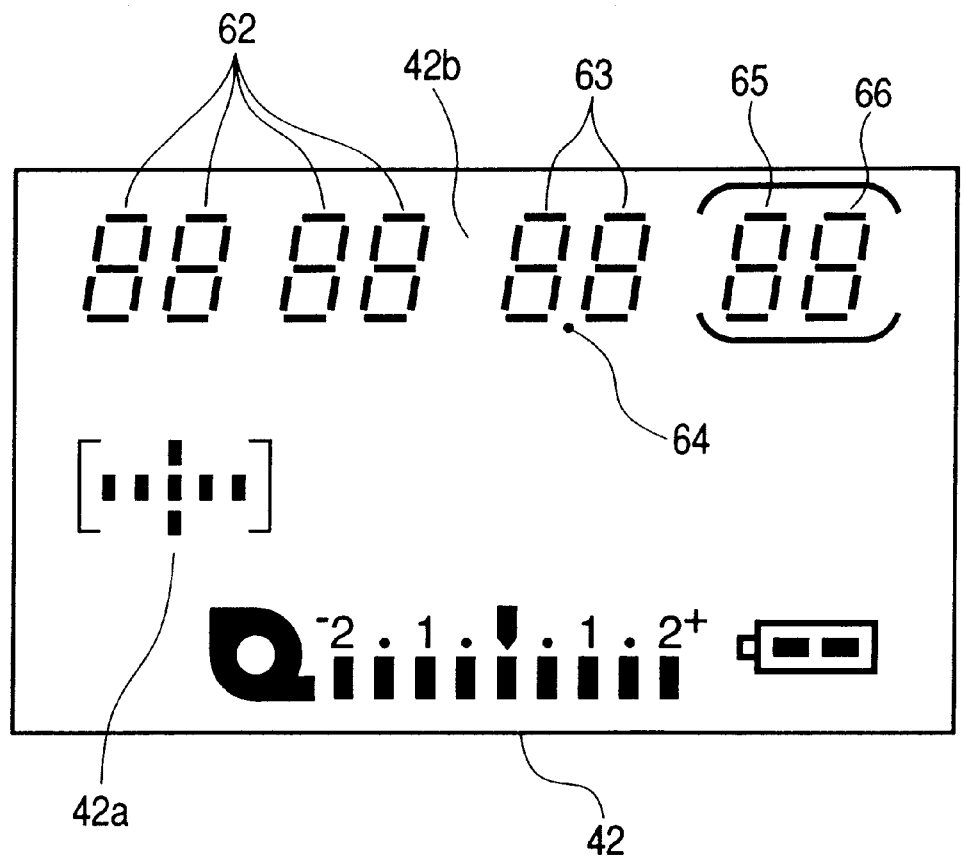
FIGS. 6A and 6B are views for illustrating a monitor LCD and an in-finder LCD, respectively, provided in the camera of FIG. 1.
Figure 6B:
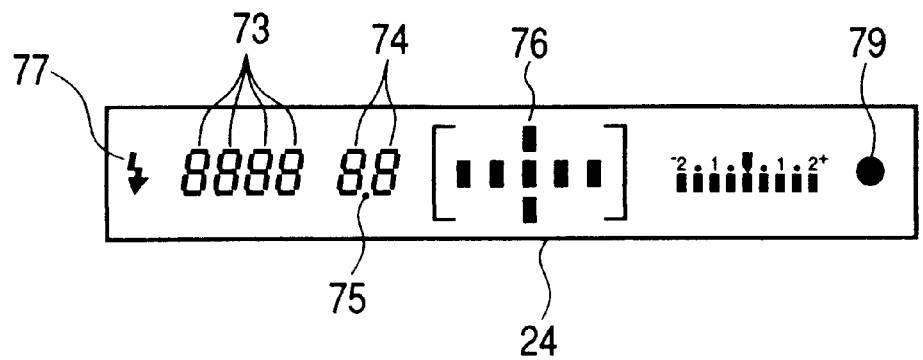

FIGS. 6A and 6B show the contents of all the display segments of the monitor LCD 42 and the in-binder LCD 24.

In FIG. 6A, conventional photographing mode display or the like is provided in a fixed display segment portion 42a. This fixed display segment portion 42a includes an AF point display portion for displaying information regarding the AF point, and a film mark or the like indicative of the presence or absence of the film. The 7-segment portion 42b for displaying a variable numerical value is comprised of 7 segments 62 of four digits for displaying a shutter time, 7 segments 63 of two digits and a decimal point 64 for displaying an aperture value, and 7 segments 65 of two digits for displaying the number of film frames.

In FIG. 6B, the reference numerals 73, 74 and 75 designate the same display segments as the shutter time display and the aperture value display, the reference numeral 76 denotes the same display segment as an AF point display portion for displaying the information regarding the AF point, the reference numeral 77 designates a stroboscope charge completing mark, and the reference numeral 79 denotes an in-focus mark indicative of the in-focus state of the photo-taking lens.

The operations of the essential portions of the camera of the above-described construction will now be described with reference to the flow charts of FIGS. 8 and 9. It is to be understood that a program AE is set as the photographing mode.

When a battery is connected to the camera, the power supply of the camera becomes ON (#100), and the CPU 100 starts its operation from a step #101. At the step #101, the initialization when the battery has been connected to the camera is first effected. For example, the initialization of a variable or the like used for the focus detection in the CPU 100 and the control of the camera is effected. Also, a variable F_POINT is rendered into "3" to set the AF point to the central AF point for the initialization of the AF point in the AF point arbitrary selecting mode. This variable F_POINT represents the AF point, and represents the left outside AF point in the case of "1", the left inside AF point in the case of "2", the center AF point in the case of "3", the right inside AF point in the case of "4", the right outside AF point in the case of "5", the upper side AF point in the case of "6", and the lower side AF point in the case of "7". Also, a variable AUTO_FP indicative of the main object AF point in the AF point automatic selecting mode is cleared. The correspondence between this variable AUTO_FP and the AF point is the same as a variable F_POINT.

At the next step #102, the opened or closed state of the back lid 55 is detected. If the back lid 55 is opened and the switch SWBP is ON, advance is made to a step #104, where a variable FRAMER is cleared. This variable FRAMER represents the number of exposed frames. The variable FRAMER representing the number of photographs is 0 when the film is absent, and becomes 1 after the blank feeding of the film, and is increased by 1 each time one frame is photographed, and during the rewinding of the film, it is subtracted by 1 each time one frame is rewound. Thereafter, advance is made to a step #107.

Also, if at the step #102, it is judged that the back lid 55 is closed and the switch SWBP is ON, advance is made to a step #103, where whether the film is present in the film magazine containing chamber is detected. If the film is present in the film magazine containing chamber and the switch SWPT is OFF, advance is made to a step #105, and if the film is absent in the film magazine containing chamber and the switch SWPT is ON, advance is made to the aforedescribed step #104.

At the step #105, whether the variable FRAMER indicative of the number of exposed frames is 0 is judged, and if it is 0, advance is made to a step #106 to effect the blank feeding of the film, and the routine "blank feeding" is called and the blank feeding of the film is executed. The details of this subroutine "blank feeding" will be described later. When return is made from this subroutine "blank feeding", return is made to the step #102.

Also, if at the step #105, the variable FRAMER indicative of the number of exposed frames is not 0, advance is made to a step #107, where the release button 41 is depressed to its first stroke, and whether the switch SW1 is ON is judged. If the switch SW1 is ON, advance is made to the step #110 of FIG. 9, and if the switch SW1 is OFF, the variable AUTO_FP indicative of the main object AF point of the AF point automatic selecting mode is cleared, and advance is made to a step #108.

At the step #108, whether one of the lower button 47a, the upper button 47b, the right button 47c and the left button 47d of the AF point select key 47 is operated is judged. If one of the lower button 47a, the upper button 47b, the right button 47c and the left button 47d of the AF point select key 47 is depressed and one of the switch SWFP_D, the switch SWFP_U, the switch SWFP_R and the switch SWFP_L is ON, advance is made to a step #109, and if not so, return is made to the step #102.

By this step #108, the camera functions so as not to accept a change in the AF point by the first operation alone of the AF point select key 47, and is only changed over to an AF point changing operation state.

At the step #109, the subroutine "AF point changing determination 1" is called, and the determination of the acceptance of the AF point changing operation and the changing operation are executed. The details of this subroutine "AF point changing determination 1" will be described later. When return is made from the subroutine "AF point changing determination 1", return is made to the step #102.

Figure 9:
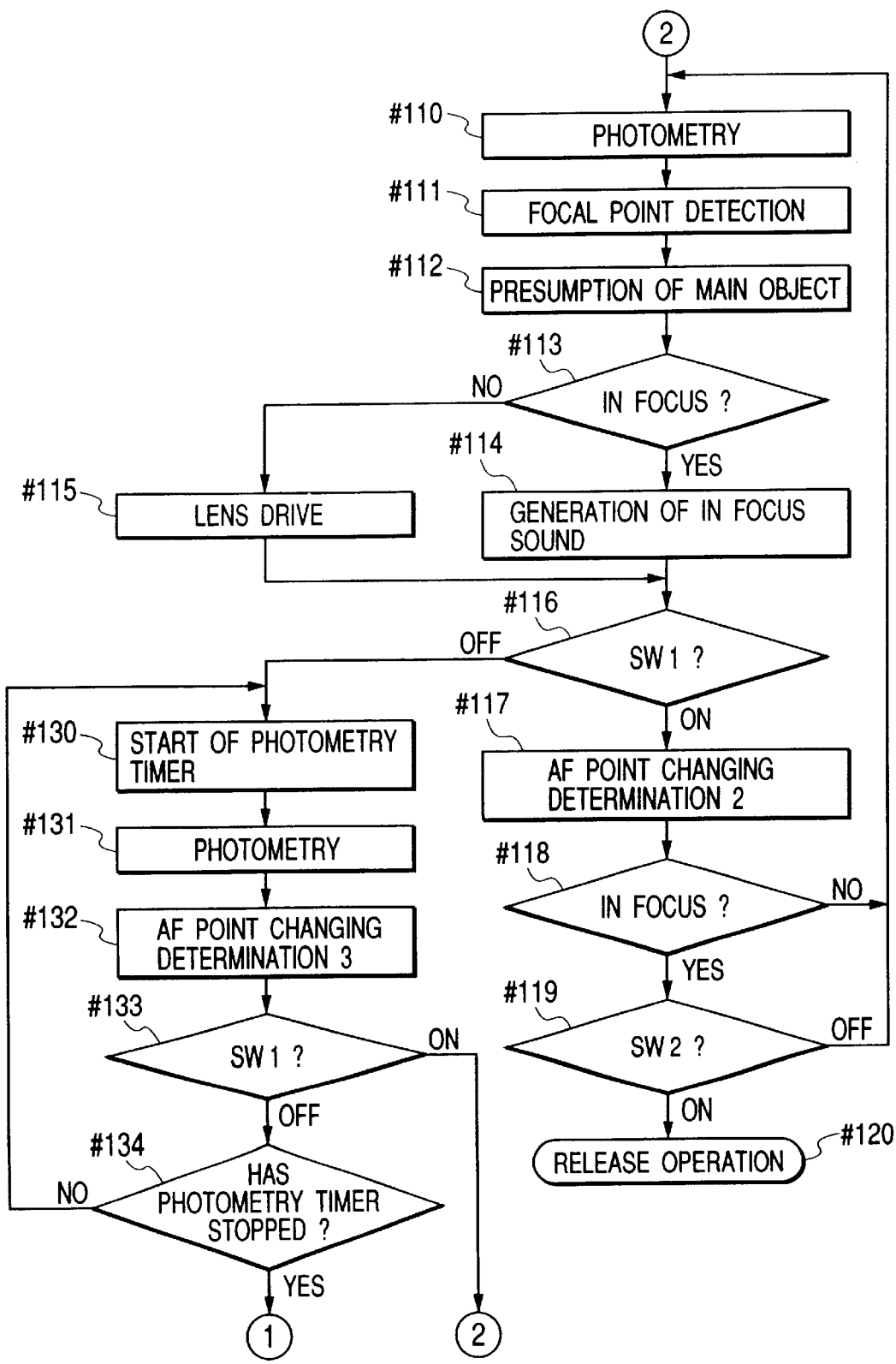
FIG. 9 is a flow chart showing the continuation of the operation of FIG. 8.

If at the step #107, the switch SW1 is ON, advance is made to the step #110 of FIG. 9 as previously described, and the photometering operation is performed. Specifically, a photometric value BV is first found from the luminance of a plurality of areas in a photographing range. Then, a shutter time and an aperture value are found from the photometric value BV, film sensitivity, etc. At the next step #111, the subroutine "focal point detection" is called, and at all AF points, the focus state is detected. The details of this subroutine "focal point detection" will be described later. Then, at a step #112, a focal point detection result is selected from the focal point detection results at all AF points. Here, 1) in the case of the arbitrary selecting mode, a designated AF point, i.e., the AF point of the variable F_POINT indicative of an AF point, is selected; and 2) in the case of the automatic selecting mode, the main object is presumed from each focal point detection result (defocus amount), and an AF point presumed to be the main object is selected.

In this embodiment, the AF point located on the nearest side is presumed to be the main object. Also, the AF point presumed to be the main object is stored in the variable AUTO_FP indicative of the main object AF point of the automatic selecting mode. Also, at a point of time whereat the in-focus state has been attained, the content of the variable AUTO_FP is stored in the variable F_POINT indicative of the AF point. This is for making a change of the AF point possible in the subroutine "AF point changing determination 2" executed at a step #117 which will be described later.

At the next step #113, whether the current focus state is the in-focus state is judged from the focal point detection result selected at the step #112. If the current focus state is the in-focus state, advance is made to a step #114, where the processing for informing the photographer that in-focus has been attained is carried out. That is, the CPU 100 sends a signal to the LCD drive circuit 105 so as to make in-focus sound. Thereafter, advance is made to a step #116. If the current focus state is not the in-focus state, advance is made from the step #113 to a step #115, where the processing for driving the photo-taking lens 1 is carried out because the current focus state is not the in-focus state. That is, the CPU 100 sends a signal to the lens focus adjust circuit 110 and drives the photo-taking lens 1 by a predetermined amount. Specifically, the lens is driven by a predetermined amount based on the focal point detection result at the AF point selected at the step #110. Thereafter, advance is made to a step #116.

At the step #116, the release button 41 is depressed to its first stroke, and whether the switch SW1 is ON is judged, and if the switch SW1 is ON, advance is made to a step #117, and if not so, the variable AUTO_FP indicative of the main object AF point of the automatic selecting mode is cleared, and advance is made to a step #130.

When advance is made to the step #117, the subroutine "AF point changing determination 2" is called, and the determination of the acceptance of the AF point changing operation and the changing operation are executed. The details of this subroutine "AF point changing determination 2" will be described later. When return is made from the subroutine "AF point changing determination 2", advance is made to a step #118, where whether the current focus state is the in-focus state is judged from the focal point detection result selected at the step #112. If the current focus state is the in-focus state, advance is made to a step #119, and if not so, return is made to the step #110. At the step #119, the release button 41 is depressed to its second stroke, and whether the switch SW2 is ON is judged, and if it is ON, advance is made to a step #120, where jump is made to release control to perform the release operation. The details of the release operation will be described later. If the switch SW2 is not ON, return is made to the step #110.

If at the step #116, the switch SW1 is not ON, advance is made to the step #130 as previously described, and a photometry continuing timer (4 seconds) is started. Here, the photometry continuing timer will be described.

Usually, when the release button 41 is depressed to its first stroke and the switch SW1 is ON, photometry and focal point detection are effected as shown at the steps #110 to #115. Thereafter, when the finger is released from the release button 41, photometry is repetitively effected for a predetermined time. A timer for counting the above-mentioned predetermined time is called the photometry continuing timer. One of the purposes of this photometry continuing timer is to improve the operability when in the aforedescribed program AE, the so-called program shift of changing the combination of a shutter time and an aperture value determined by the camera is effected. Specifically, design is made such that by operating the aforedescribed electronic dial even after the release button 41 is depressed to attain the in-focus state, and then the finger is once released from the release button 41, the program shift (changing the combination of the shutter time and the aperture value) can be effected.

At the next step #131, as at the step #110, the photometering operation is performed. Specifically, the photometric value BV is first found from the luminance of a plurality of areas in the photographing range. A shutter time and an aperture value are then found from the photometric value BV, film sensitivity, etc. Thereafter, advance is made to a step #132, where the subroutine "AF point changing determination 3" is called, and the determination of the acceptance of the AF point changing operation and the changing operation are executed. The details of this subroutine "AF point changing determination 3" will be described later. When return is made from the subroutine "AF point changing determination 3", advance is made to a step #133, where the release button 41 is depressed to its first stroke, and whether the switch SW1 is ON is judged, and if it is ON, return is made to the step #110, and if not so, advance is made to a step #134. Then, if at the step #134, the photometry continuing timer is not time up, return is made to the step #130, and if the photometry continuing timer is time up, return is made to the step #102.

Figure 10:
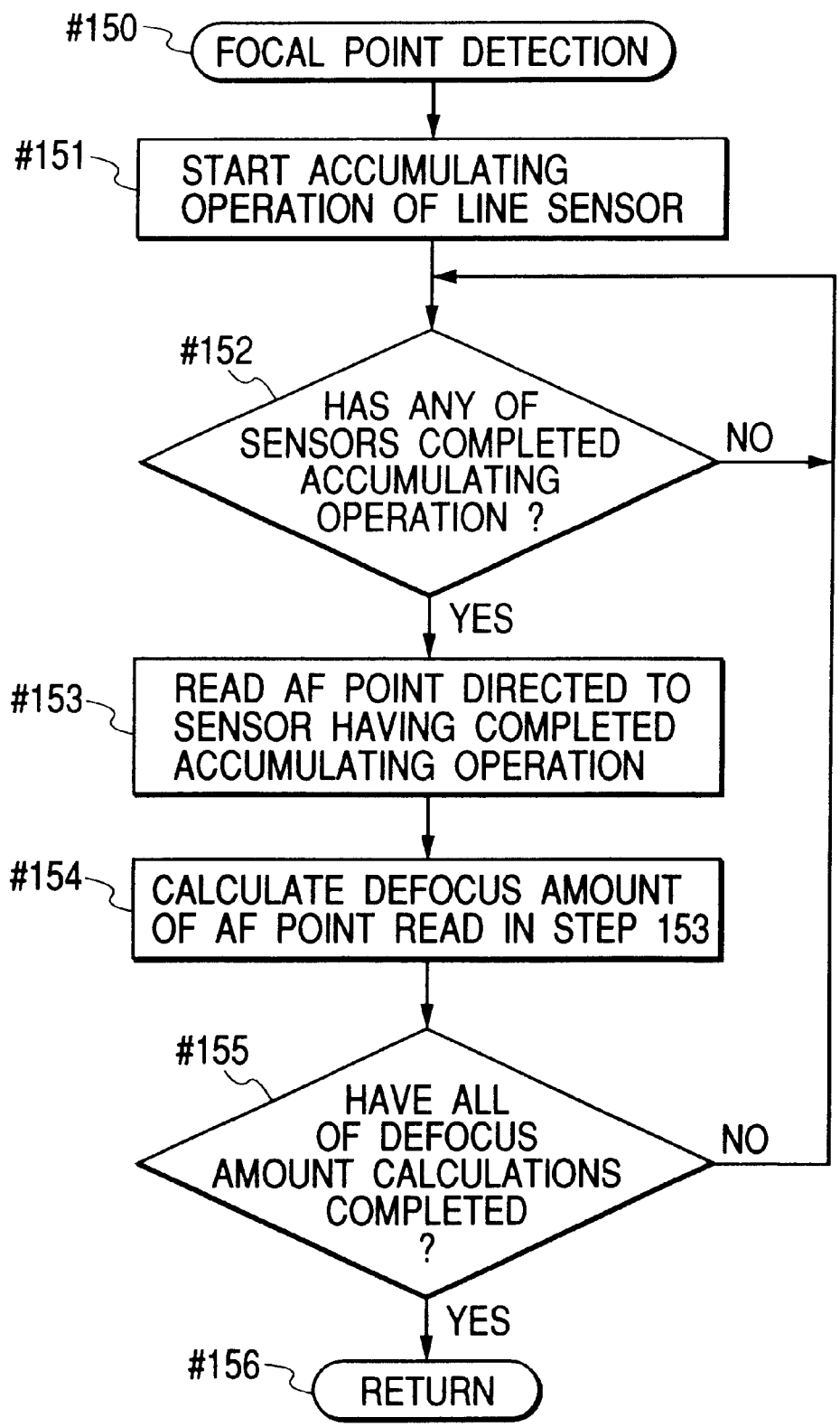
FIG. 10 is a flow chart showing the subroutine "focal point detection" of a camera according to an embodiment of the present invention.

The subroutine "focal point detection" will now be described with reference to the flow chart of FIG. 10. This subroutine "focal point detection" effects the process of detecting the focus states at all AF points.

First, at a step #151, the CPU 100 sends a signal to the focus detecting circuit 103 and starts the accumulating operation of seven sets of line sensors corresponding to all AF points. Then, at the next step #152, the CPU waits until any of the accumulating seven sets of line sensors has completed the accumulating operation. At the next step #153, the signal of the line sensor corresponding to the AF point judged to have completed the accumulating operation at the step #152 is read out. Then at a step #154, focal point detecting calculation is effected on the basis of the signal of the line sensor read out at the step #153, and the result thereof is stored as a defocus amount in the memory for each AF point. Thus, the signal of each line sensor which has completed the accumulation is read out, and focal point detecting calculation is effected.

At the next step #155, whether the focal point detecting calculations corresponding to all AF points have been completed is judged, and if all the focal point detecting calculations have not been completed, return is made to the step #152, and if all the focal point detecting calculations have been completed, advance is made to a step #156. At this step #156, the subroutine "focal point detection" is terminated, and return is made.

Figure 11:
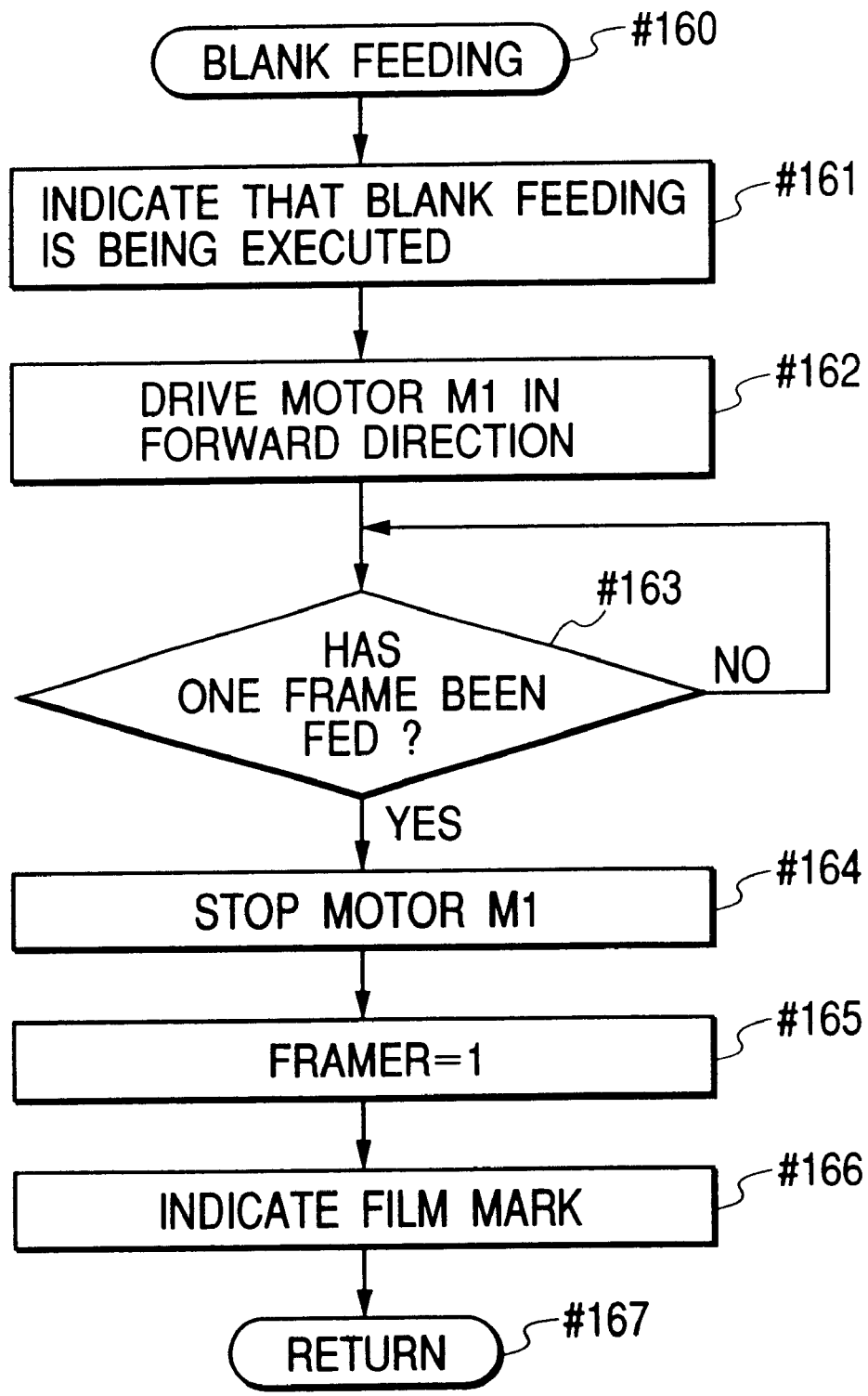
FIG. 11 is a flow chart showing the subroutine "blank feeding" of the camera according to an embodiment of the present invention.

The subroutine "blank feeding" will now be described with reference to the flow chart of FIG. 11.

First, at a step #161, indication for informing that blank feeding is being executed is effected. For this purpose, the CPU 100 sends a signal to the LCD drive circuit 105 to thereby turn on the film mark of the monitor LCD 42. Also, it turns off the portion for indicating the number of film frames. At the next step #162, the CPU 100 sends a signal to the motor control circuit 108 to thereby drive the motor M1 in a forward direction. It also sends a signal to the film detecting circuit 109, and by the signal from the photosensor 110, it brings about a state in which the position of the film being fed is detectable. At the next step #163, the CPU 100 continues to monitor the signal from the photosensor 110, and waits until one frame of the film has been fed.

At the next step #164, one frame of the film has been fed and therefore the CPU 100 sends a signal to the motor control circuit 108 to thereby stop the motor M1. Then, at a step #165, the variable FRAMER indicative of the number of exposed frames is rendered into 1. At the next step #166, in order to release the indication informing that blank feeding is being executed, the CPU 100 sends a signal to the LCD drive circuit 105 to thereby turn on the film mark of the monitor LCD 42. It also makes the portion for indicating the number of film frames indicate the content of the variable FRAMER indicative of the number of exposed frames.

Then, at a step #167, the subroutine "blank feeding" is completed, and return is made.

Figure 12:
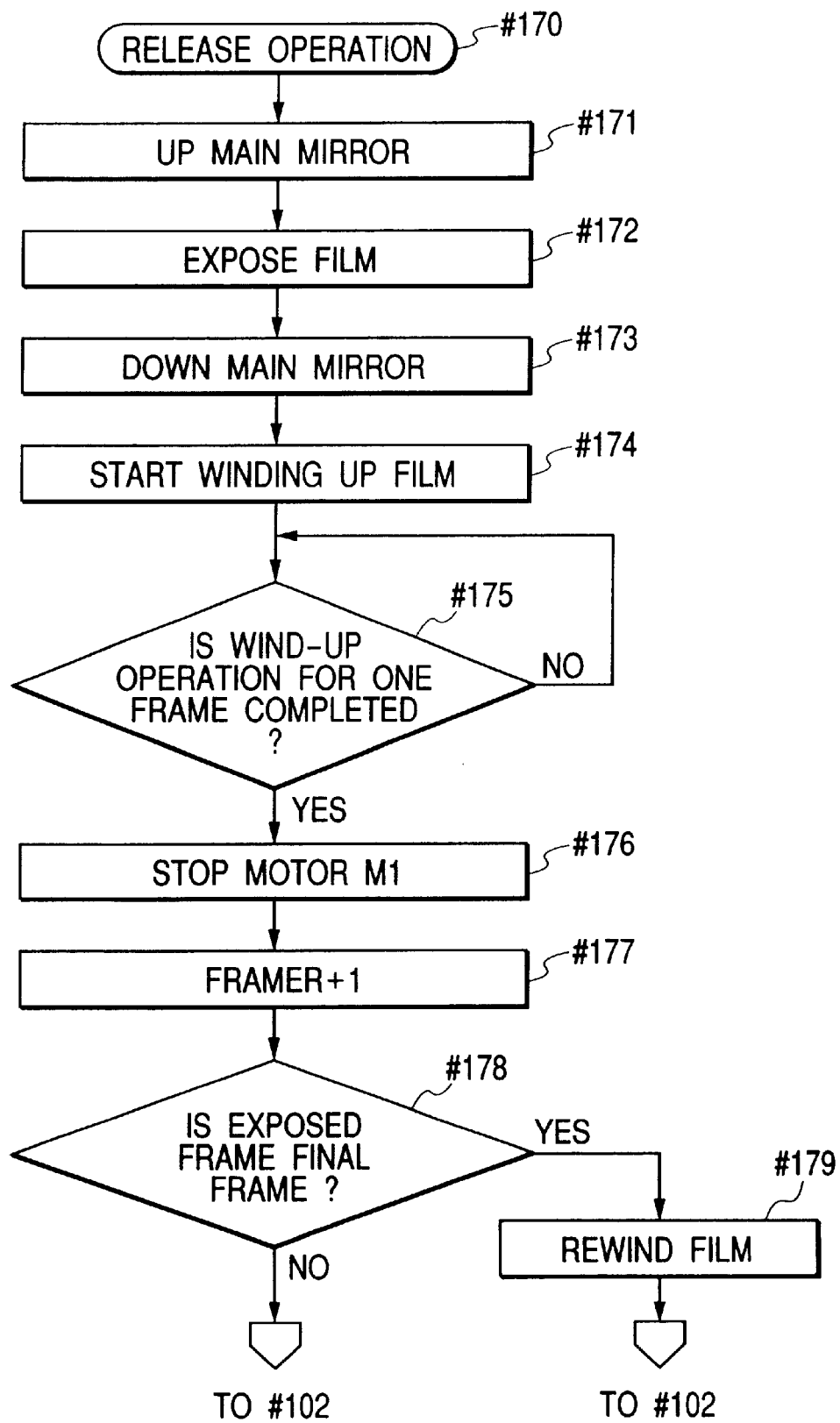
FIG. 12 is a flow chart showing the release operation in the camera according to an embodiment of the present invention.

The release operation will now be described with reference to the flow chart of FIG. 12.

The operation is started from a step #170, and first at a step #171, the main mirror 2 is upped as the preparation for exposing the film 5. For this purpose, the CPU 100 sends a signal to the motor control circuit 108 to thereby start driving the motor M2 in a forward direction. Thereafter, it continues to monitor the phase signals CMSP1 and CMSP2 of a phase substrate, not shown, and when the phase signals assume a mirror up position, the CPU 100 sends a signal to the motor control circuit 108 to thereby stop the driving of the motor M2. Also, the CPU 100 sends a signal to the aperture stop drive device 32 including the aperture stop drive circuit 111 to thereby stop down the aperture stop 31 by a predetermined amount.

At the next step #172, the exposure of the film 5 is effected. Specifically, the CPU 100 first sends a signal to the shutter control circuit 107, electrically energizes the magnet MG1 and opens the forward curtain of the shutter 4. The aperture value of the aperture stop 31 and the shutter time of the shutter 4 are determined by the photometry of the step #110. After the lapse of a predetermined shutter time, the CPU 100 sends a signal to the shutter control circuit 107, electrically energizes the magnet MG2 and closes the rearward curtain of the shutter 4. Thus, the exposure of the film 5 is completed.

At a step #173, the main mirror 2 is downed and shutter charge is effected when the exposure of the film 5 is completed. For this purpose, the CPU 100 sends a signal to the motor control circuit 108 to thereby start driving the motor M2 in a forward direction. Thereafter, it continues to monitor the phase signals CMSP1 and CMSP2 of the phase substrate, not shown, and when the phase signals assume a mirror down position, the CPU 100 sends a signal to the motor control circuit 108 to thereby stop the driving of the motor M2. The CPU 100 also sends a signal to the aperture stop drive device 32 including the aperture stop drive circuit 111, to thereby return the aperture stop 31 to its opened state. At the next step #174, in order to effect the winding-up of the film 5, the CPU 100 sends a signal to the motor control circuit 108 to thereby start driving the motor M1 in a forward direction. The CPU 100 also sends a signal to the film detecting circuit 109, and by the signal from the photosensor 110, it brings about a state in which the position of the film being fed is detectable.

At the next step #175, the CPU 100 waits until the winding-up of one frame is completed. Then, at the next step #176, the winding-up of one frame has been completed and therefore, the CPU 100 sends a signal to the motor control circuit 108 to thereby stop the driving of the motor M1. At the next step #177, the winding-up of one frame has been completed and therefore, 1 is added to the number of exposed frames FRAMER, and if at the next step #178, it is after the completion of the exposure of the last frame of the film, advance is made to a step #179, and if not so, return is made to the step #102.

When advance is made to the step #179, the subroutine "rewind film" is called. The details of this subroutine "rewind film" will hereinafter be described. When return is made from the subroutine "rewind film", return is made to the step #102.

Figure 13:
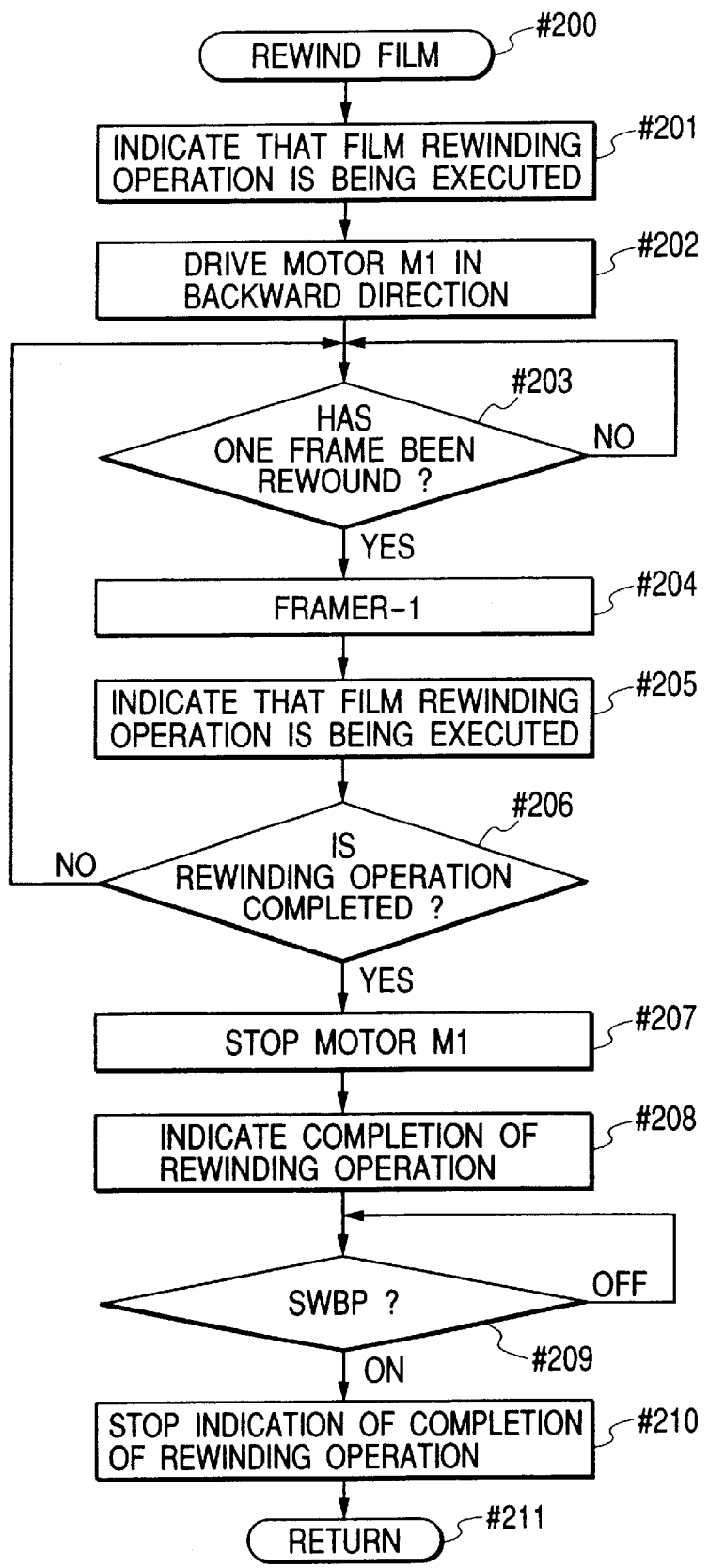
FIG. 13 is a flow chart showing the subroutine "film rewinding" of the camera according to an embodiment of the present invention.

The subroutine "rewind film" will now be described with reference to the flow chart of FIG. 13.

First, at a step #201, the indication for informing that the film rewinding operation is being executed is effected. For this purpose, the CPU 100 sends a signal to the LCD drive circuit 105 to thereby turn on the film mark of the monitor LCD 42. Also, the content of the number of exposed frames FRAMER is indicated on the portion for indicating the number of film frames. At the next step #202, in order to start the rewinding of the film, the CPU 100 sends a signal to the motor control circuit 108 to thereby drive the motor M1 in a backward direction. The CPU 100 also sends a signal to the film detecting circuit 109, and by the signal from the photosensor 110, it brings about a state in which the position of the film being fed is detectable.

At the next step #203, the CPU 100 continues to monitor the signal from the photosensor 110, and waits until the film is rewound by one frame. Then, at the next step #204, the film has been rewound by one frame and therefore, 1 is subtracted from the variable FRAMER indicative of the number of exposed frames. At the next step #205, when the film rewinding operation is being executed, 1 is subtracted from the indication of the number of film frames on the monitor LCD 42 each time the film is rewound by one frame. For this purpose, the CPU 100 sends a signal to the LCD drive circuit 105 to thereby make the portion for indicating the number of film frames on the monitor LCD 42 indicate the content of the variable FRAMER indicative of the number of exposed frames.

At a step #206, whether the rewinding operation has been completed is judged. The judgment as to whether the rewinding operation has been completed is done by whether the variable FRAMER indicative of the number of exposed frames is 0. When the variable FRAMER indicative of the number of exposed frames is 0, that is, when the rewinding operation has been completed, advance is made to a step #207, and if not so, return is made to the step #203. At the step #207, the rewinding of the film 5 has been completed and therefore, the CPU 100 sends a signal to the motor control circuit 108 to thereby stop the motor M1, and at the next step #208, it effects the indication for informing that the rewinding operation has been completed. For this purpose, the CPU 100 sends a signal to the LCD drive circuit 105 to thereby turn on and off the film mark of the monitor LCD 42. It also turns off the portion for indicating the number of film frames.

At the next step #209, whether the film has been taken out is judged. The CPU 100 waits until the back lid 55 is opened in order to take out the film and the switch SWBP becomes ON. At the next step #210, the indication for informing that the rewinding operation has been completed is released. Then, at a step #211, the subroutine "rewind film" is completed, and return is made.

Figure 14:
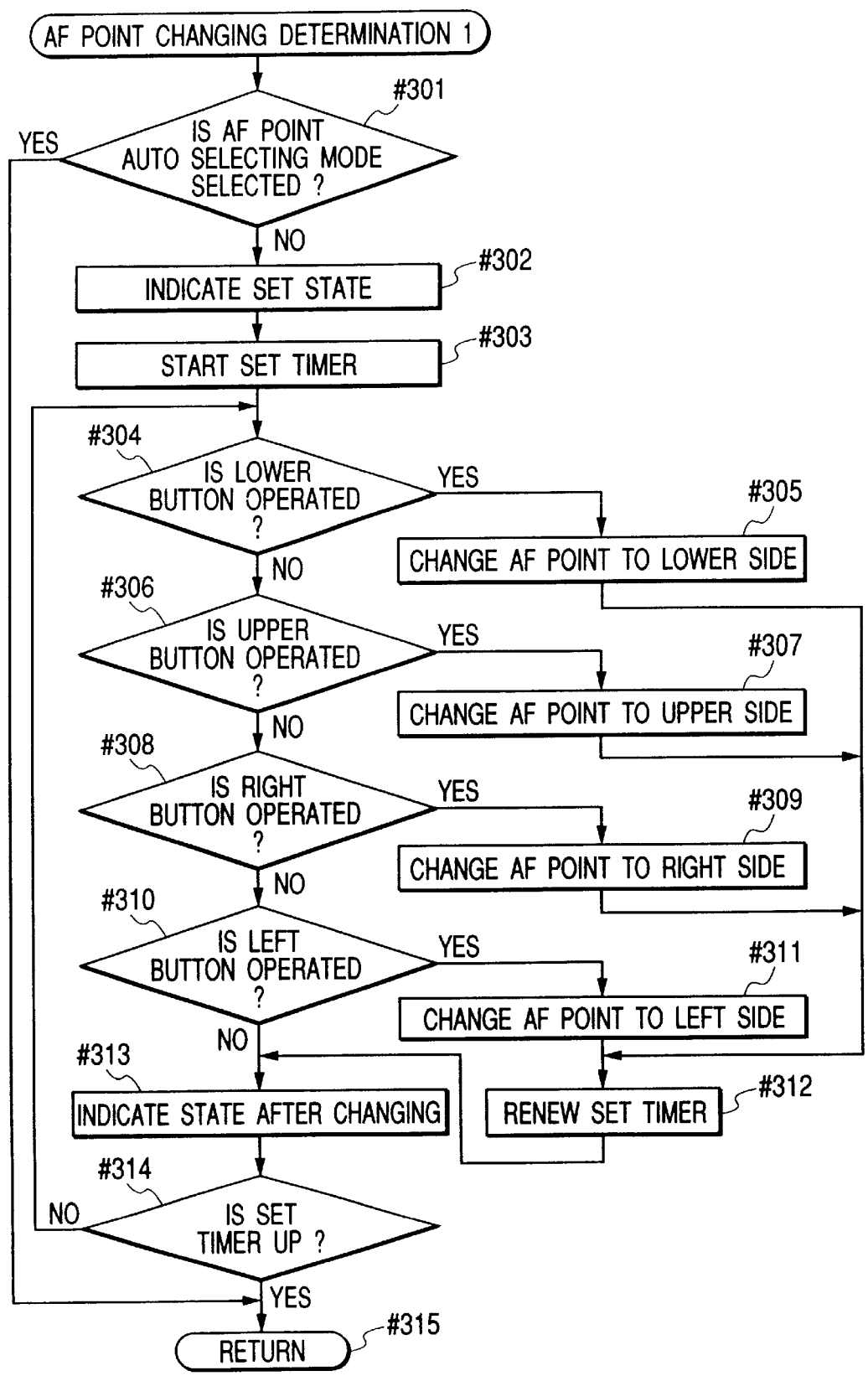
FIG. 14 is a flow chart showing the subroutine "AF point changing determination 1" of the camera according to an embodiment of the present invention.

The subroutine "AF point changing determination 1" will now be described with reference to the flow chart of FIG. 14.

First, if at a step #301, the AF point selecting mode lever 46 is set at the A side, and the switch SWAFSEL is ON, that is, if the current mode is the AF point auto selecting mode, advance is made to a step #315, and if not so, advance is made to a step #302. Design is made such that if at this step #301, the current mode is the AF point arbitrary selecting mode, the AF point changing operation is accepted.

At the next step #302, steps #302 to #315 are portions for performing an operation responding to the actual AF point changing operation.

First, design is made such that by the first operation of the AF point changing member (AF point select key 47), the AF point changing operation state is entered (steps #108 and #109), and when the AF point changing member is operated in the AF point changing operation state, a change of the AF point can be done. Also, design is made such that when the AF point changing operation state is entered, a set timer of 6 seconds works, and each time the AF point changing member is operated, the set timer is renewed, and when the set timer is time up, the AF point changing operation state is terminated.

At a step #302, the set state of the AF point at the point of time whereat the AF point changing operation state has been entered is displayed. For this purpose, the CPU 100 sends a signal to the LCD drive circuit 105 to thereby make the AF point indicating portion of the monitor LCD 42 indicate. At the next step #303, the aforedescribed set timer of 6 seconds is started. Then, if at the next step #304, the lower button 47a of the AF point select key 47 is depressed and the switch SWFP_D is ON, advance is made to a step #305, and if the switch SWFP_D is not ON, advance is made to a step #306.

At the step #305, the AF point is changed to the lower side in accordance with the AF point changing table of FIG. 17A. Specifically, it at present, the variable F_POINT indicative of the AF point is "1", i.e., the left outside AF point, the variable F_POINT indicative of the AF point is rendered into "7" to change the AF point to the lower side AF point. If at present, the variable F_POINT indicative of the AF point is "2", i.e., the left inside AF point, the variable F_POINT indicative of the AF point is rendered into "7" to change the AF point to the lower side AF point. If at present, the variable F_POINT indicative of the AF point is "3", i.e., the central AF point, the variable F_POINT indicative of the AF point is rendered into "7" to change the AF point to the lower side AF point. If at present, the variable F_POINT indicative of the AF point is "4", i.e., the right inside AF point, the variable F_POINT indicative of the AF point is rendered into "7" to change the AF point to the lower side AF point. If at present, the variable F_POINT indicative of the AF point is "5", i.e., the right outside AF point, the variable F_POINT indicative of the AF point is rendered into "7" to change the AF point to the lower side AF point. If at present, the variable F_POINT indicative of the AF point is "6", i.e., the upper side AF point, the variable indicative of the AF point is rendered into "3" to change the AF point to the central AF point. If at present, the variable F_POINT indicative of the AF point is "7", i.e., the lower side AF point, the variable indicative of the AF point is rendered into "7" to change the AF point to the lower side AF point.

If at the next step #306, the upper button 47b of the AF point select key 47 is depressed and the switch SWFP_U is ON, advance is made to a step #307, and if not so, advance is made to a step #308.

When advance is made to the step #307, the AF point is changed to the upper side in accordance with the AF point changing table of FIG. 17B. Specifically, if at present, the variable F_POINT indicative of the AF point is "1", i.e., the left outside AF point, the variable F_POINT indicative of the AF point is rendered into "6" to change the AF point to the upper side AF point. If at present, the variable F_POINT indicative of the AF point is "2", i.e., the left inside AF point, the variable F_POINT indicative of the AF point is rendered into "6" to change the AF point to the upper side AF point. If at present, the variable F_POINT indicative of the AF point is "3", i.e., the central AF point, the variable indicative of the AF point is rendered into "6" to change the AF point to the upper side AF point. If at present, the variable F_POINT indicative of the AF point is "4", i.e., the right inside AF point, the variable indicative of the AF point is rendered into "6" to change the AF point to the upper side AF point. If at present, the variable F_POINT indicative of the AF point is "5", i.e., the right outside AF point, the variable F_POINT indicative of the AF point is rendered into "6" to change the AF point to the upper side AF point. If at present, the variable F_POINT indicative of the AF point is "6", i.e., the upper side AF point, the variable indicative of the AF point is rendered into "6" to change the AF point to the upper side AF point. If at present, the variable F_POINT indicative of the AF point is "7", i.e., the lower side Af point, the variable F_POINT indicative of the AF point is rendered into "3" to change the AF point to the central AF point.

If at the next step #308, the right button 47c of the AF point select key 47 is depressed and the switch SWFP_R is ON, advance is made to a step #309, and if not so, advance is made to a step #310.

When advance is made to the step #309, the AF point is changed to the right side in accordance with the AF point changing table of FIG. 17C. Specifically, if at present the variable F_POINT indicative of the AF point is "1", i.e., the left outside AF point, the variable F_POINT indicative of the AF point is rendered into "2" to change the AF point to the left inside AF point. If at present, the variable F_POINT indicative of the AF point is "2", i.e., the left inside Af point, the variable F_POINT indicative of the AF point is rendered into "3" to change the AF point to the central AF point. If at present, the variable F_POINT indicative of the AF point is "3", i.e., the central AF point, the variable F_POINT indicative of the AF point is rendered into "4" to change the AF point to the right inside AF point. If at present, the variable F_POINT indicative of the AF point is "4", i.e., the right inside AF point, the variable F_POINT indicative of the AF point is rendered into "5" to change the AF point to the right outside AF point. If at present, the variable F_POINT indicative of the AF point is "5", i.e., the right outside AF point, the variable F_POINT indicative of the AF point is rendered into "6" to change the AF point to the upper side AF point. If at present, the variable F_POINT indicative of the AF point is "6", i.e., the upper side AF point, the variable F_POINT indicative of the AF point is rendered into "5" to change the AF point to the right outside AF point. If at present, the variable F_POINT indicative of the AF point is "7", i.e., the lower side AF point, the variable F_POINT indicative of the AF point is rendered into "5" to change the AF point to the right outside AF point.

If at the next step #310, the left button 47d of the AF select key 47 is depressed and the switch SWFP_L is ON, advance is made to a step #311, and if not so, advance is made to a step #313.

When advance is made to the step #311, the AF point is changed to the left side in accordance with the AF point changing table of FIG. 17D. Specifically, if at present, the variable F_POINT indicative of the AF point is "1", i.e., the left outside AF point, the variable F_POINT indicative of the AF point is rendered into "2" to change the AF point to the left inside AF point. If at present, the variable F_POINT indicative of the AF point is "2", i.e., the left inside AF point, the variable F_POINT indicative of the AF point is rendered into "1" to change the AF point to the left outside AF point. If at present, the variable F_POINT indicative of the AF point is "3", i.e., the central AF point, the variable F_POINT indicative of the AF point is rendered into "2" to change the AF point to the left inside AF point. If at present, the variable F_POINT indicative of the AF point is "4", i.e., the right inside AF point, the variable F_POINT indicative of the AF point is rendered into "3" to change the AF point to the central AF point. If at present, the variable F_POINT indicative of the AF point is "5", i.e., the right outside AF point, the variable F_POINT indicative of the AF point is rendered into "4" to change the AF point to the right inside AF point. If at present, the variable F_POINT indicative of the AF point is "6", i.e., the upper side AF point, the variable F_POINT indicative of the AF point is rendered into "1" to change the AF point to the left outside AF point. If at present, the variable F_POINT indicative of the AF point is "7", i.e., the lower side AF point, the variable F_POINT indicative of the AF point is rendered into "1" to change the AF point to the left outside AF point. Thereafter, advance is made to a step #312.

At the step #312, the set timer of 6 seconds is renewed, and advance is made to a step #313, where the set state of the AF point after changing is indicated. For this purpose, the CPU 100 sends a signal to the LCD drive circuit 105 to thereby make the AF point indicating portion of the monitor LCD 42 indicate. Thereafter, advance is made to a step #314, and if the set timer is time up, advance is made to a step #315, where the subroutine "AF point changing determination 1" is completed, and return is made. Also, if the set timer is not timer up, return is made to the step #304.

The subroutine "AF point changing determination 2" will now be described with reference to the flow chart of FIG. 15.

First, at a step #351, whether the AF point selecting mode lever 46 is set to the A side and the switch SWAFSEL is ON is judged, and if this switch is ON, that is, if the current mode is the AF point automatic selecting mode, advance is made to a step #352, and if not so, advance is immediately made to a step #353. If at the step #352, the focus state is the in-focus state, advance is made to the step #353, and if not so, advance is made to a step #362.

Design is made such that if at the steps #351 and #352, the current mode is the arbitrary selecting mode, the AF point changing operation is accepted. Also, design is made such that if the current mode is the automatic selecting mode, the AF point changing operation is accepted only after the in-focus state has been attained.

If at the next step #353, the lower button 47a of the AF point select key 47 is depressed and the switch SWFP_D is ON, advance is made to a step #354, and if not so, advance is made to a step #355. When advance is made to the step #354, the AF point is changed to the lower side in accordance with the AF point changing table of FIG. 17A. The content of the changing is the same as that of the step #305.

If at the next step #355, the upper button 47b of the AF point select key 47 is depressed and the switch SWFP_U is ON, advance is made to a step #356, and if not so, advance is made to a step #357. When advance is made to the step #356, the AF point is changed to the upper side in accordance with the AF point changing table of FIG. 17B. The content of the changing is the same as that of the step #307.

If at the step #357, the right button 47c of the AF point select key 47 is depressed and the switch SWFP_R is ON, advance is made to a step #358, and if not so, advance is made to a step #359. When advance is made to the step #358, the AF point is changed to the right side in accordance with the AF point changing table of FIG. 17C. The content of the changing is the same as that of the step #309.

If at the next step #359, the left button 47d of the AF select key 47 is depressed and the switch SWFP_L is ON, advance is made to a step #360, and if not so, advance is made to a step #362. When advance is made to the step #360, the AF point is changed to the left side in accordance with the AF point changing table of FIG. 17D. The content of the changing is the same as that of the step #311. Thereafter, advance is made to a step #361, where the set state after the change of the AF point is indicated. For this purpose, the CPU 100 sends a signal to the LCD drive circuit 105 to thereby make the AF point indicating portion of the monitor LCD 42 indicate.

Then, at the step #362, the subroutine "AF point changing determination 2" is completed, and return is made.

Figure 16:
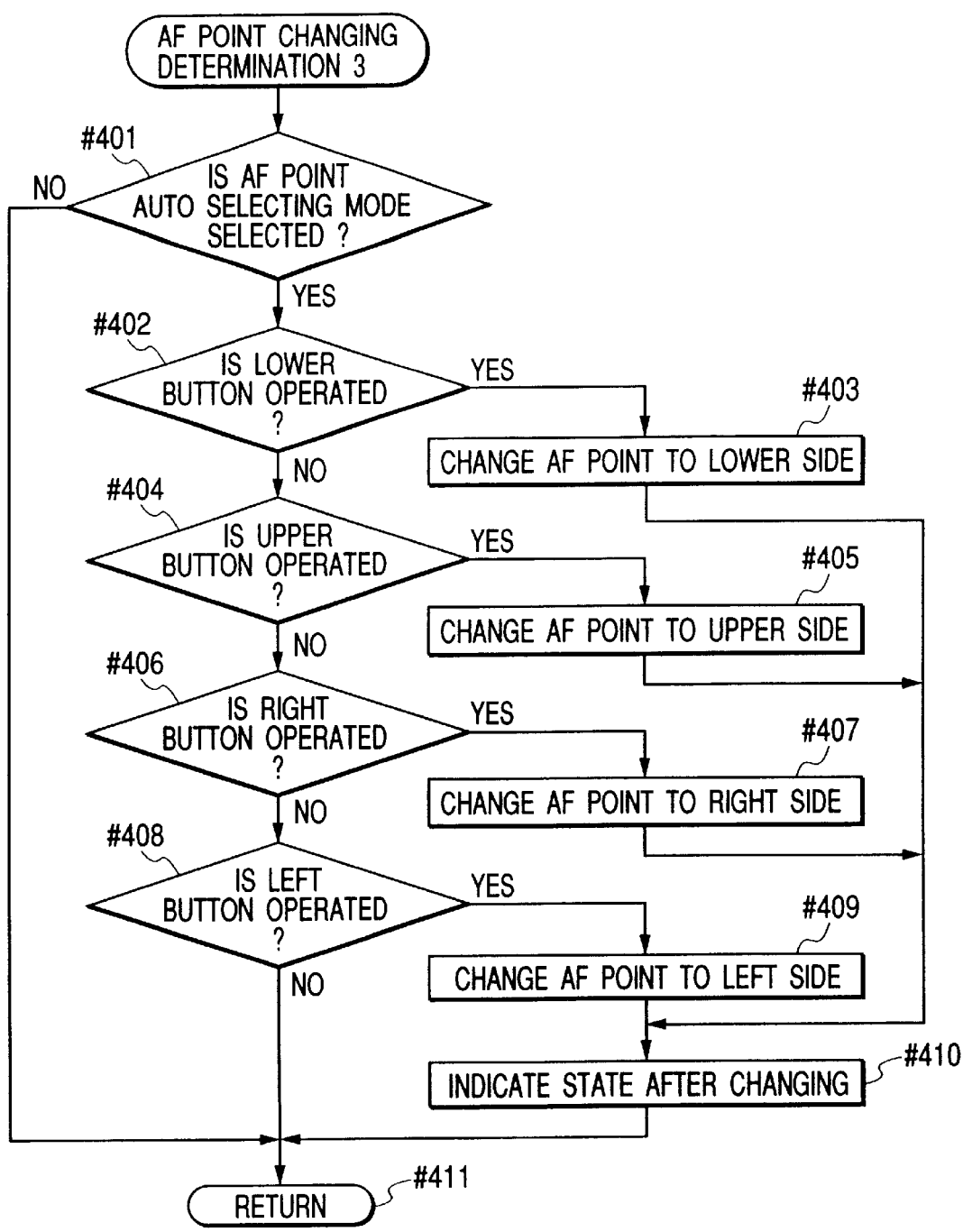
FIG. 16 is a flow chart showing the subroutine "AF point changing determination 3" of the camera according to an embodiment of the present invention.
Figure 18:
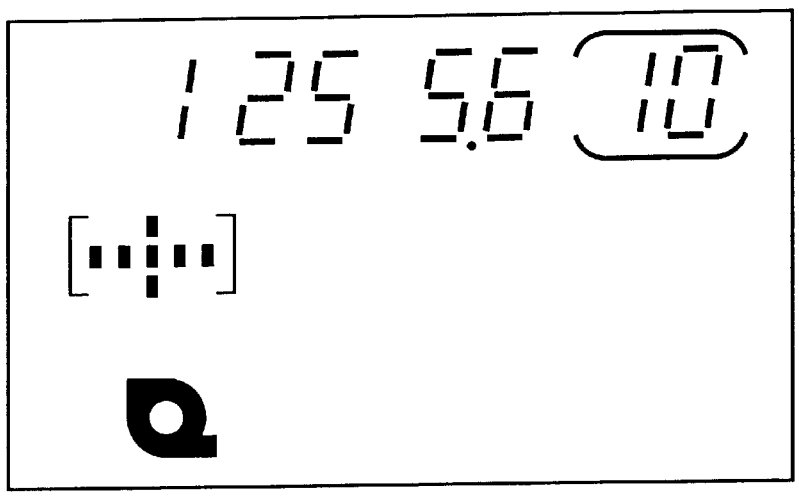
FIG. 18 shows an example of the outside indication of a prior-art camera having a plurality of AF points.
Figure 19:
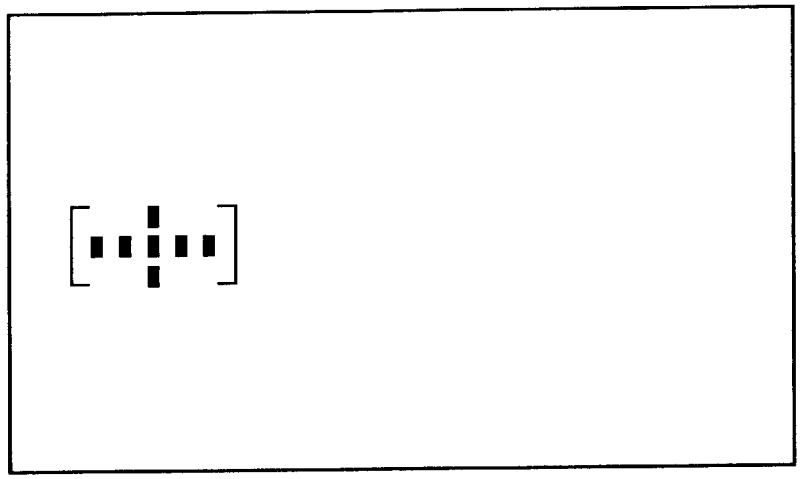
FIG. 19 shows an example of the outside when in the camera of FIG. 18, an automatic selecting method is set as the AF point setting mode.
Figure 20:
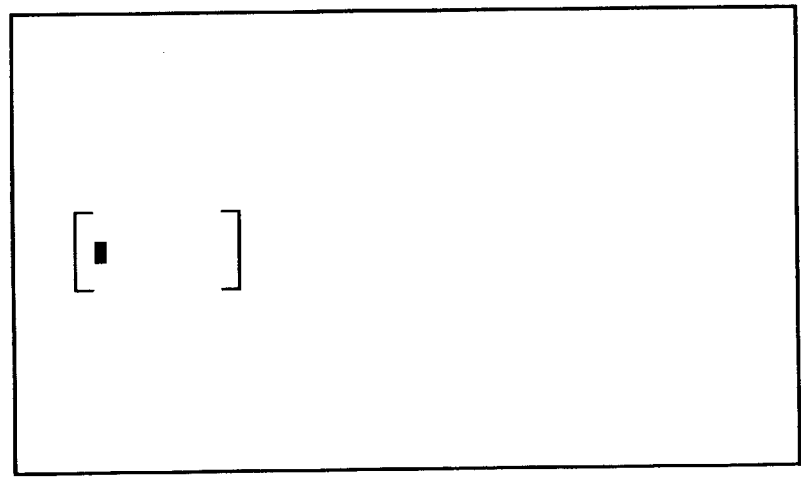
FIG. 20 shows an example of the outside when in the camera of FIG. 18, an arbitrary selecting method is set as the AF point setting mode.

The subroutine "AF point changing determination 3" will now be described with reference to the flow chart of FIG. 16.

First, if at a step #401, the AF point selecting mode lever 46 is set to the A side and the switch SWAFSEL is ON, that is, if the current mode is the AF point automatic selecting mode, advance is made to a step #411, and if not so, advance is made to a step #402. Design is made such that if at this step, the current mode is the AF point arbitrary selecting mode, the AF point changing operation is accepted.

If at the next step #402, the lower button 47a of the AF point select key 47 is depressed and the switch SWFP_D is ON, advance is made to a step #403, and if not so, advance is made to a step #404. When advance is made to the step #403, the AF point is changed to the lower side in accordance with the AF point changing table of FIG. 17A. The content of the changing is the same as that of the step #305.

If at the next step #404, the upper button 47b of the AF point select key 47 is depressed and the switch SWFP_U is ON, advance is made to a step #405, and if not so, advance is made to a step #406. When advance is made to the step #405, the AF point is changed to the upper side in accordance with the AF point changing table of FIG. 17B. The content of the changing is the same as that of the step #307.

If at the next step #406, the right button 47c of the AF point select key 47 is depressed and the switch SWFP_R is ON, advance is made to a step #407, and if not so, advance is made to a step #408. When advance is made to the step #407, the AF point is changed to the right side in accordance with the AF point changing table of FIG. 17C. The content of the changing is the same as that of the step #309.

If at the next step #408, the left button 47d of the AF point select key 47 is depressed and the switch SWFP_L is ON, advance is made to a step #409, and if not so, advance is made to a step #411. When advance is made to the step #409, the AF point is changed to the left side in accordance with the AF point changing table of FIG. 17D. The content of the changing is the same as that of the step #311. Thereafter, advance is made to a step #410, where the set state of the AF point after changing is indicated. For this purpose, the CPU 100 sends a signal to the LCD drive circuit 105 to thereby make the AF point indicating portion of the monitor LCD 42 indicate.

At the step #411, the subroutine "AF point changing determination 3" is terminated, and return is made.

Figure 8:
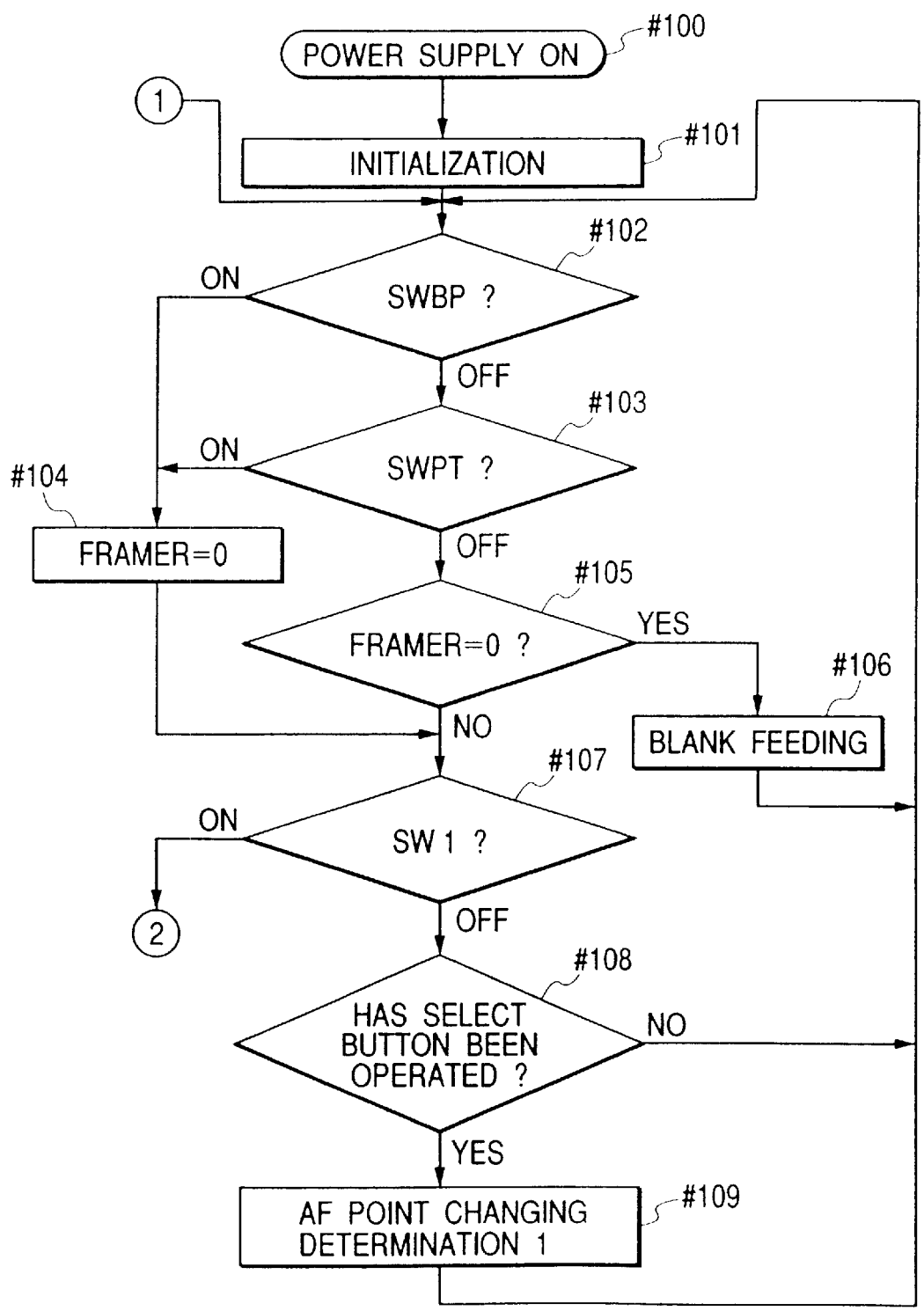
FIG. 8 is a flow chart showing a part of the operation of a camera according to an embodiment of the present invention.

As has hitherto been described, 1) in the so-called standby wherein the camera is executing neither of photometry and focal point detection, when one of the lower button 47a, the upper button 47b, the right button 47c and the left button 47d of the AF point select key 47 is depressed, the subroutine "AF point changing determination 1" is called, and the AF point changing operation state is entered (the steps #108 and #109 of FIG. 8). Thereafter, when the lower button 47a of the AF point select key 47 is depressed, the AF point is changed to the lower side (the steps #304 and #305). Also, when the upper button 47b of the AF point select key 47 is depressed, the AF point is changed to the upper side (the steps #306 and #307 of FIG. 14). Also, when the right button 47c of the AF point select key 47 is depressed, the AF point is changed to the right side (the steps #308 and #309). Also, when the left button 47d of the AF point select key 47 is depressed, the AF point is changed to the left side (the steps #310 and #311).

Figure 15:
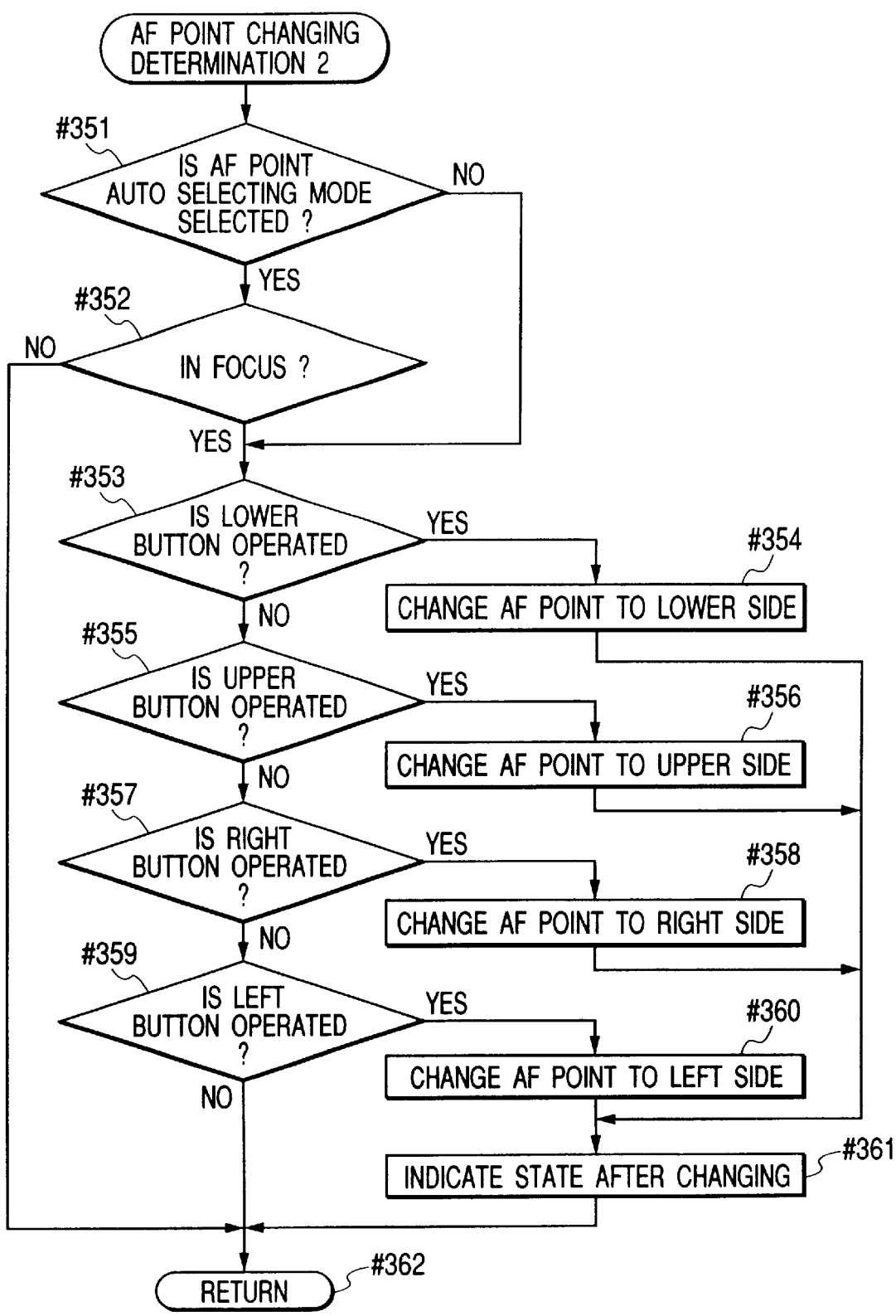
FIG. 15 is a flow chart showing the subroutine "AF point changing determination 2" of the camera according to an embodiment of the present invention.

2) In a state wherein the release button 41 is depressed to its first stroke and the switch SW1 is ON, the subroutine "AF point changing determination 2" is called at the step #117, and when the AF point selecting mode lever 46 is set to the A side, i.e., the AF point automatic selection, the camera is made to function so as to accept AF point changing only when the focus state is the in-focus state, and when the AF point selecting mode lever 46 is set to the M side, i.e., the AF point arbitrary selection, the camera is made to function so as to accept AF point changing without any condition (the steps #351 and #352 of FIG. 15). When at this time, the lower button 47a of the AF point select key 47 is depressed, the AF point is changed to the lower side (the steps #353 and #354). Also, when the upper button 47b of the Af point select key 47 is depressed, the AF point is changed to the upper side (the steps #355 and #356). Also, when the right button 47c of the AF point select key 47 is depressed, the AF point is changed to the right side (the steps #357 and #358). Also, when the left button 47d of the AF point select key 47 is depressed, the AF point is changed to the left side (the steps #359 and #360).

3) In a state wherein the photometry continuing timer is operating, if at the step #132, the subroutine "AF point changing determination 3" is called and the AF point selecting mode lever 46 is set to the A side, i.e., the AF point automatic selection, the camera functions so as not to accept AF point changing (the step #401 of FIG. 16) and when the AF point selecting mode lever 46 is set to the M side, i.e., the AF point arbitrary selection, the camera accepts the AF point changing (the steps #402 to #411). When at this time, the lower button 47a of the AF point select key 47 is depressed, the AF point is changed to the lower side (the steps #402 and #403). Also, when the upper button 47b of the AF point select key 47 is depressed, the AF point is changed to the upper side (the steps #404 and #405). Also, when the right button 47c of the AF point select key 47 is depressed, the AF point is changed to the right side (the steps #406 and #407). Also, when the left button 47d of the AF point select key 47 is depressed, the AF point is changed to the left side (the steps #408 and #409).

In the above-described operation, 1) in the so-called standby wherein the camera is executing neither of photometry and AF, by the first operation of the lower button 47a, the upper button 47b, the right button 47c and the left button 47d of the AF point select key, the AF point changing operation state is only entered and AF point changing is not executed, and by the operation of the lower button 47a, the upper button 47b, the right button 47c and the left button 47d of the AF point select key after the AF point changing operation state has been entered, Af point changing is effected and therefore, the problem that AF point changing is effected by touching the AF point select key 47 by mistake can be prevented.

2) In a state wherein the release button 41 is depressed to its first stroke, when the AF point selecting mode lever 46 is set to the A side, i.e., the AF point automatic selection, the camera is made to function so as to accept AF point changing only during the in-focus state, whereby even when the changing of the AF point is necessary such as when the AF point the camera has judged to be a main object is inappropriate, the changing of the AF point becomes possible in a moment and therefore, the operability of the AF point changing operation can be improved.

Also, when the AF point selecting mode lever 46 is set to the M side, i.e., the AF point arbitrary selection, the camera is made to function so as to accept AF point changing without any condition, whereby the changing of the AF point becomes possible in a moment and therefore, the operability of the AF point changing operation can be improved.

3) In a state wherein the photometry continuing timer is operating, the camera functions so as not to accept AF point changing if the AF point selecting mode lever 46 is set to the A side, i.e., the AF point automatic selection, whereby the problem that AF point changing is effected by touching the AF point select key 47 by mistake can be prevented.

Also, when the AF point selecting mode lever 46 is set to the M side, i.e., the AF point arbitrary selection, the camera accepts AF point changing without any condition, whereby the changing of the AF point becomes possible in a moment and therefore, the operability of the AF point changing operation can be improved.

As described above, the compatibility of the prevention of malfunctioning and the improvement in operability can be realized.

What is claimed is:

1. A camera provided with a focus detecting circuit for effecting focus detection in a plurality of different areas in an image field, and a focus adjusting apparatus having an automatic mode for automatically selecting a predetermined one of the results of focus detection in said plurality of areas and effecting focus adjustment, and an arbitrary mode for selecting any one of said plurality of areas and effecting focus adjustment, said camera including:
    a change operating member for changing said area in said arbitrary mode;
    a changing circuit for changing and setting said selected area by the operation of said change operating member; and
    a control circuit for effecting the changing and setting of the area in said changing circuit by the operation of said change operating member in an in-focus state when said mode is the automatic mode.

2. A camera according to claim 1, wherein said control circuit effects the changing and setting of the area in said changing circuit by the operation of said change operating member irrespective of the focus state when the mode is the arbitrary mode.

3. A camera according to claim 2, wherein said control circuit prohibits the changing and setting of the area in said changing circuit by the operation of said change operating member until the in-focus state is attained by the focus adjustment in the automatic mode.

4. A camera according to claim 1, wherein said area is disposed in two-dimensional directions, and said change operating member indicates the selection of the area in the two-dimensional directions.

5. A camera provided with a focus adjusting apparatus having a focus detecting circuit for effecting focus detection in a plurality of different areas in an image field, a mode setting member for selecting an automatic mode for automatically selecting a predetermined one of the results of focus detection in said plurality of areas, and an arbitrary mode for selecting any one of said plurality of areas, and a driving circuit for driving an imaging lens in conformity with the result selected during the automatic mode, and driving the imaging lens in conformity with the result of detection detected by said focus detecting circuit in the area selected during the arbitrary mode, said camera including:

a change operating member for changing said area in said arbitrary mode;

a changing circuit for changing and setting said selected area by the operation of said change operating member;

a judging circuit for judging whether the result of the detection by said focus detecting circuit after the lens driving by said lens driving circuit when said mode is the automatic mode is an in-focus state; and a control circuit for effecting the changing and setting of the area in said changing circuit by the operation of said change operating member when it is judged by said judging circuit that the result of the detection is the in-focus state.

* * * * *